F. MÜLLER.
METAL CUTTING MACHINE.
APPLICATION FILED NOV. 10, 1917.
1,429,611.
Patented Sept. 19, 1922.
8 SHEETS—SHEET 2.
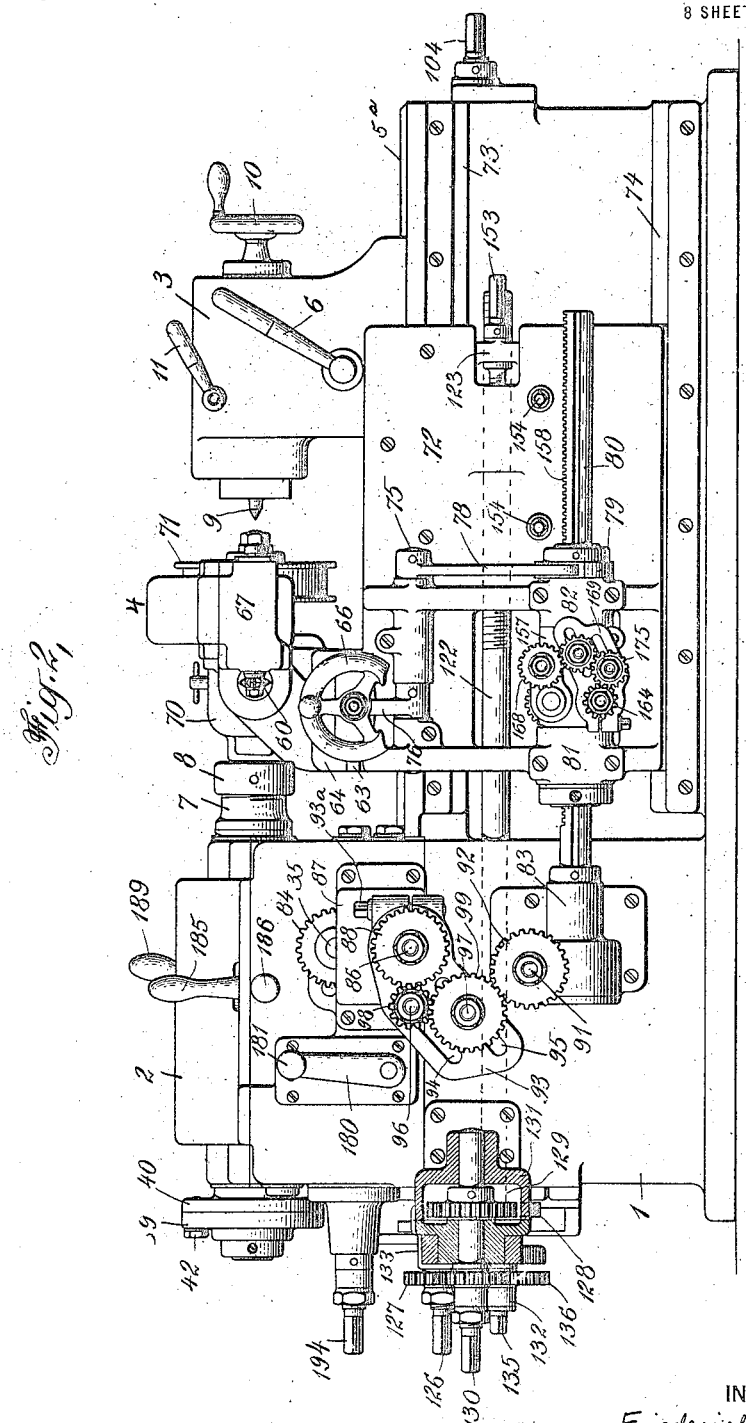
INVENTOR
Friederich Müller
BY S. Jay Teller
ATTORNEY F. MÜLLER.
METAL CUTTING MACHINE.
APPLICATION FILED NOV. 10, 1917.
1,429,611.
Patented Sept. 19, 1922.
8 SHEETS—SHEET 3.
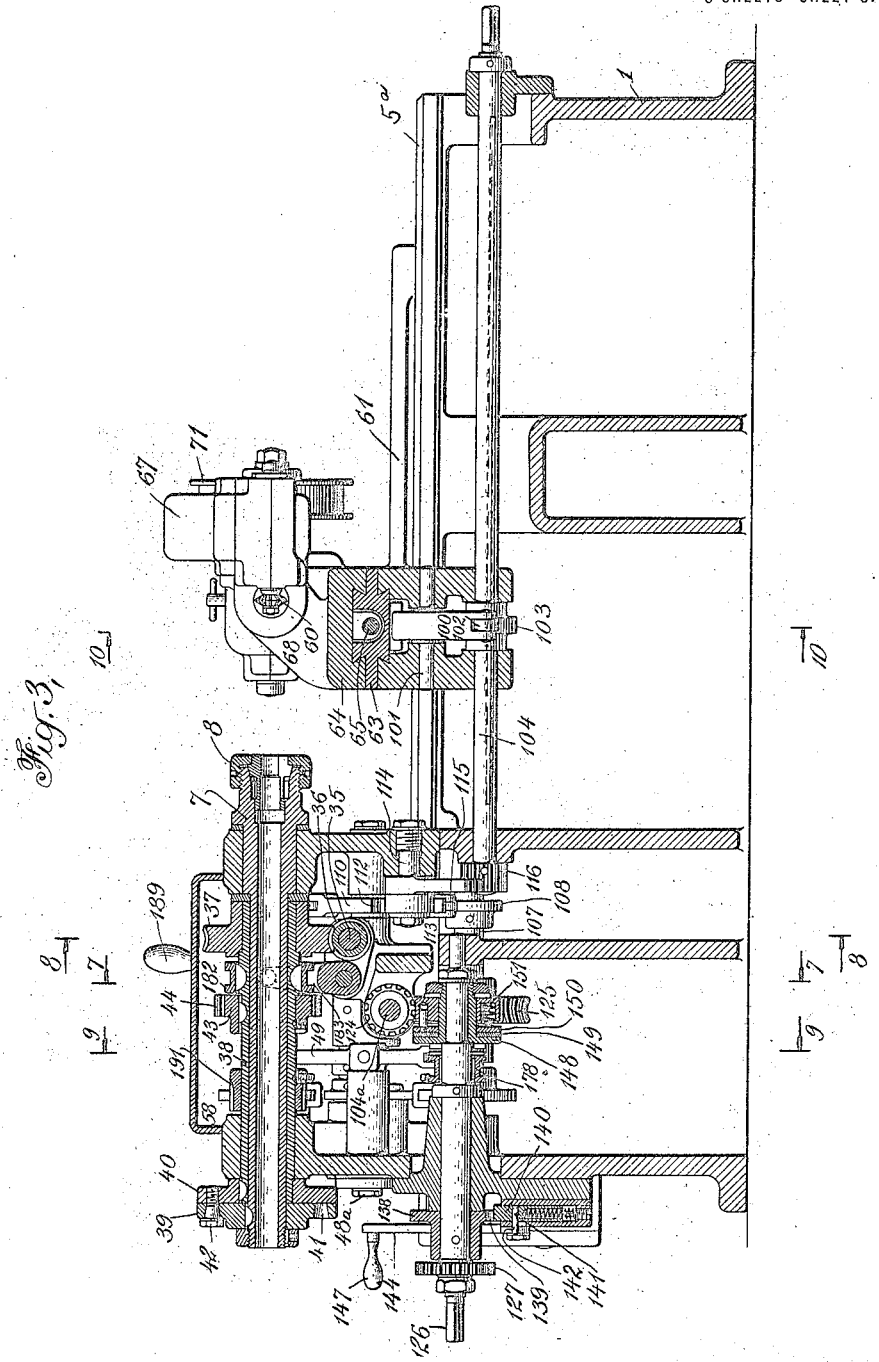
INVENTOR
Friederich Müller
BY S. Jay Teller
ATTORNEY

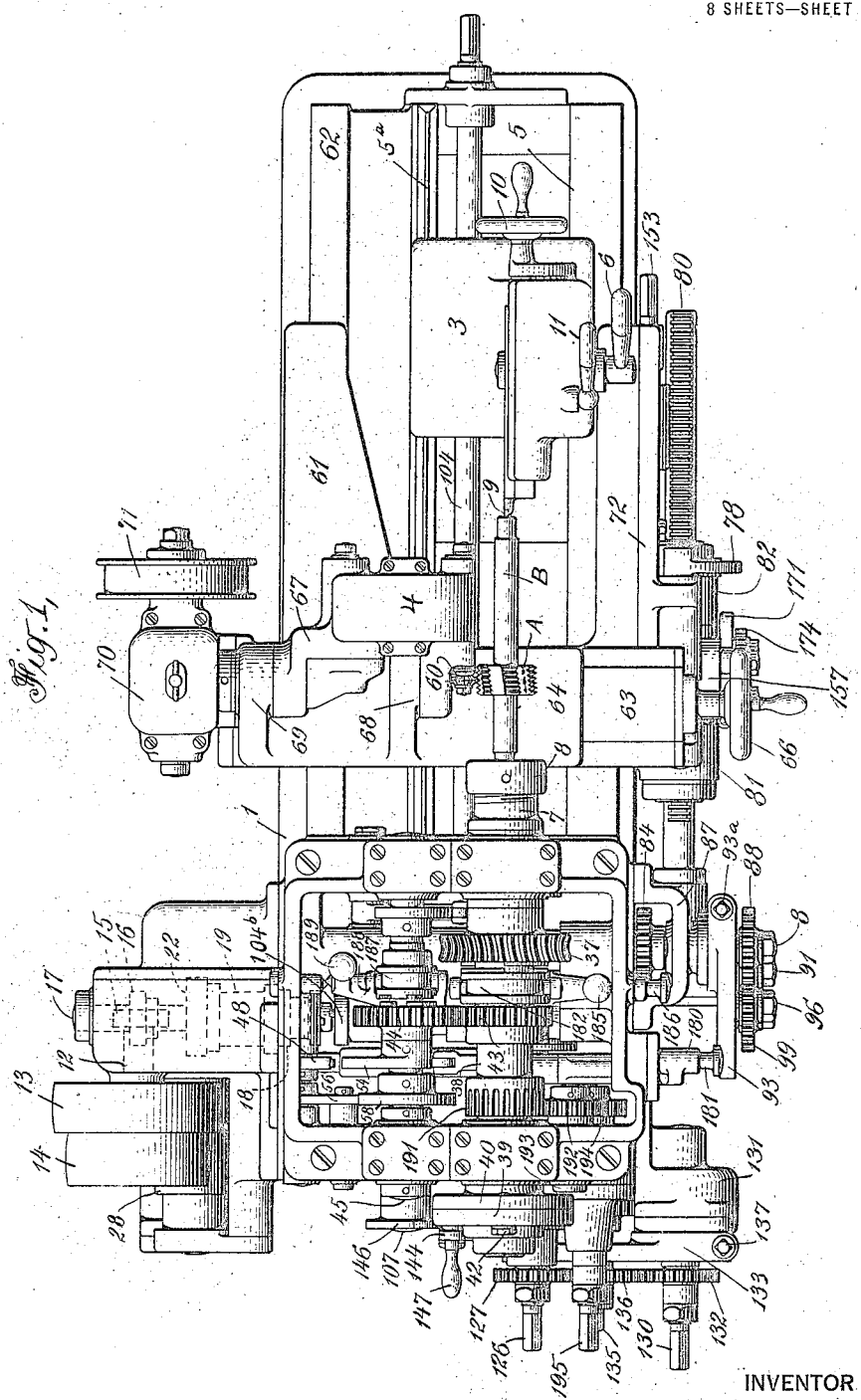

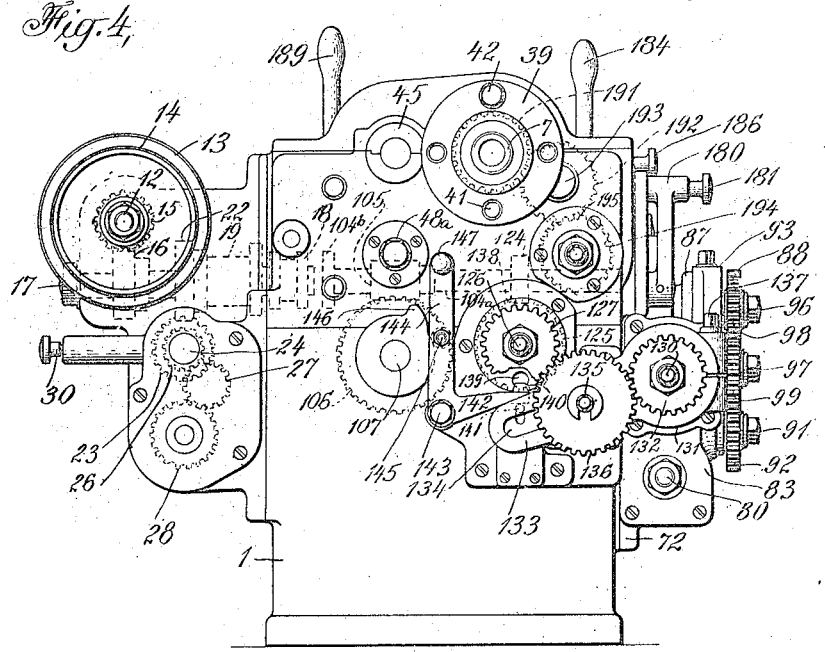
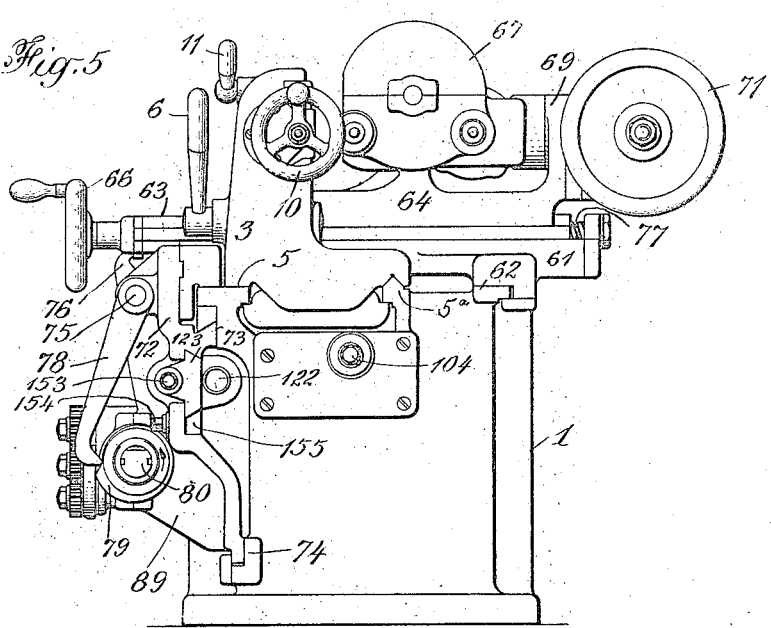

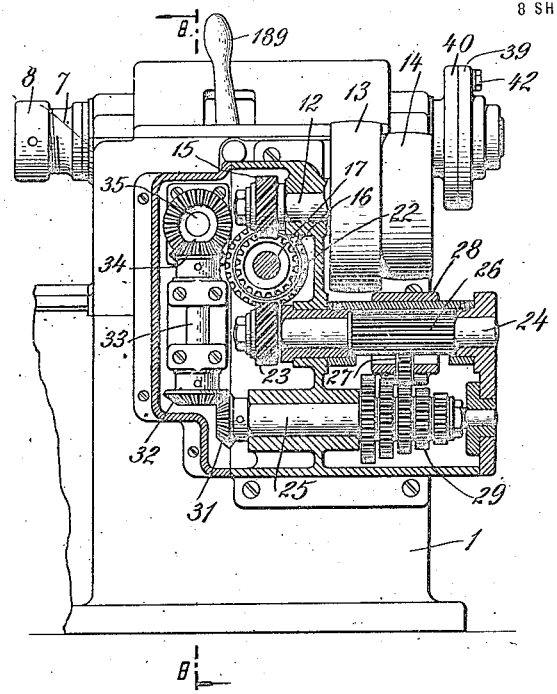

F. MÜLLER.
METAL CUTTING MACHINE.
APPLICATION FILED NOV. 10, 1917.

1,429,611.

Patented Sept. 19, 1922.
8 SHEETS—SHEET 6.

INVENTOR
Friederich Müller
BY S. Jay Teller
ATTORNEY

F. MÜLLER.
METAL CUTTING MACHINE.
APPLICATION FILED NOV. 10, 1917.

1,429,611.

Patented Sept. 19, 1922.
8 SHEETS—SHEET 7.

INVENTOR
Friederich Müller
BY S. Jay Teller
ATTORNEY

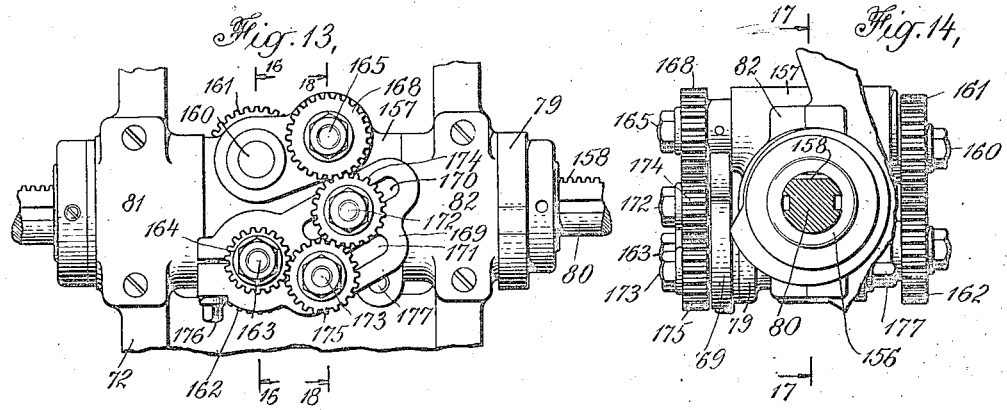
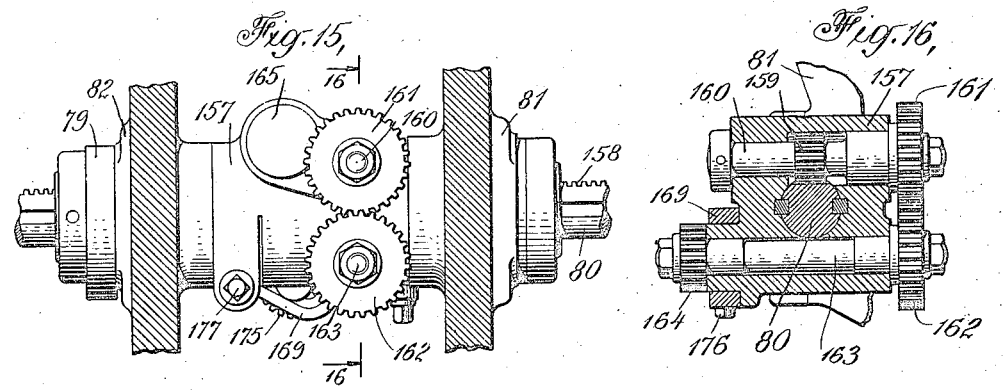
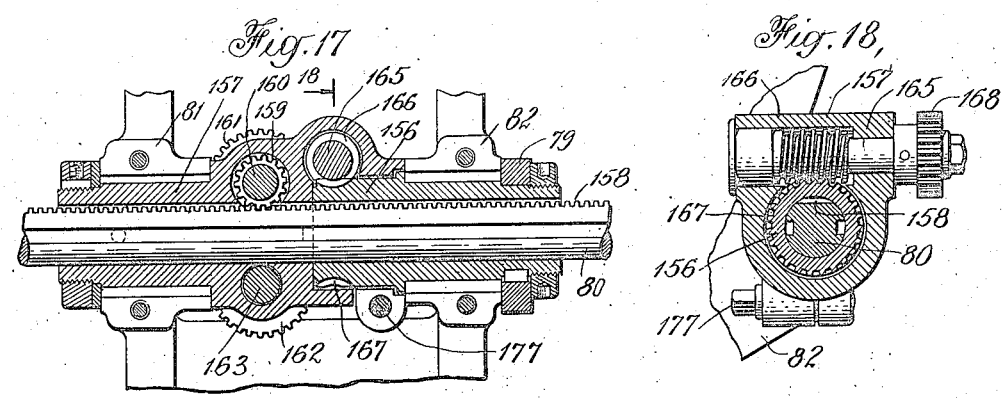

Patented Sept. 19, 1922.

1,429,611

UNITED STATES PATENT OFFICE.

FRIEDERICH MÜLLER, OF HARTFORD, CONNECTICUT, ASSIGNOR TO PRATT & WHITNEY COMPANY, OF NEW YORK, N. Y., A CORPORATION OF NEW JERSEY.

METAL-CUTTING MACHINE.

Application filed November 10, 1917. Serial No. 201,338.

*To all whom it may concern:*

Be it known that I, FRIEDERICH MÜLLER, a citizen of the United States, residing at Hartford, in the county of Hartford and State of Connecticut, have invented certain new and useful Improvements in Metal-Cutting Machines, of which the following is a specification.

The invention relates especially to a metal cutting machine in which relative movements are effected between the cutting tool and the blank longitudinally of the latter in order that the cutting operation may be completed. The machine is particularly adapted for making milling cutters or other rotatable tools requiring relief. One of the objects of the invention is to provide in a machine of this class improved means whereby the relation of the relieving movements of the tool to the rotative movement of the blank may be varied as the tool is moved longitudinally, thus causing the tool to cut a relief conforming to helical teeth on the blank. Another object of the invention is to provide means whereby the variation above set forth may be made to take place at different rates or in either direction to conform to helical teeth with different angles and to conform to right-hand and left-hand helical teeth.

A further object of the invention is to provide means for giving the tool step-by-step or intermittent feeding movements along the blank. Preferably the tool is withdrawn out of engagement with the blank prior to each longitudinal movement and returned to engagement with the blank after such longitudinal movement, and preferably the blank is stopped during each longitudinal movement. It is to be understood that the invention is not limited to the intermittent feeding of the tool, the withdrawal of the tool and the stopping of the blank all in conjunction with each other, as each of them may be independently useful for certain classes of work. A further object of the invention is to provide improved means for causing the said feeding and withdrawing movements to take place automatically and for causing the rotation of the blank to be stopped and started in timed relation with the said movements. A further object of the invention is to provide improved means for effecting the disengagement and engagement of the tool with the blank, as aforesaid, without interfering with the normal relationship between the tool and the blank as controlled by the relieving mechanism. A still further object of the invention is to provide means whereby the blank is rotated through a little more than one revolution at each actuation, thus insuring the cutting of a complete annular groove therein by the tool.

A further object of the invention is to provide improved means whereby the machine can be used at the option of the operator either for cutting hobs with annular grooves or for cutting hobs with inclined or helical grooves.

Further objects of the invention will be apparent from the following specification and claims.

In the accompanying drawings I have shown the embodiment of the invention which I now deem preferable, but it will be understood that various modifications and substitutions of equivalents can be made without departing from the spirit of the invention as set forth in the claims appended to this specification.

Of the drawings:

Fig. 1 is a plan view, the cover of the headstock being removed to show the interior parts.

Fig. 2 is a front elevation.

Fig. 3 is a longitudinal vertical sectional view taken through the center of the machine.

Fig. 4 is an end view taken from the left.

Fig. 5 is an end view taken from the right.

Fig. 6 is a fragmentary rear view with parts shown in section.

Fig. 11 is a detail sectional view showing a part of the drive mechanism for the lead screw.

Fig. 12 is a detail sectional view showing the connection between the lead screw and the apron.

Fig. 13 is a fragmentary front view of the mechanism for varying the relation of the relieving movements of the cutter.

Fig. 14 is an end view of the mechanism shown in Fig. 13.

Fig. 15 is a rear view of the mechanism shown in Fig. 13.

Fig. 16 is a sectional view taken along the lines 16—16 of Figs. 13 and 15.

Fig. 17 is a longitudinal sectional view taken along the line 17—17 of Fig. 14.

Fig. 18 is a transverse sectional view taken along the lines 18—18 of Figs. 13 and 17.

Figure 7:
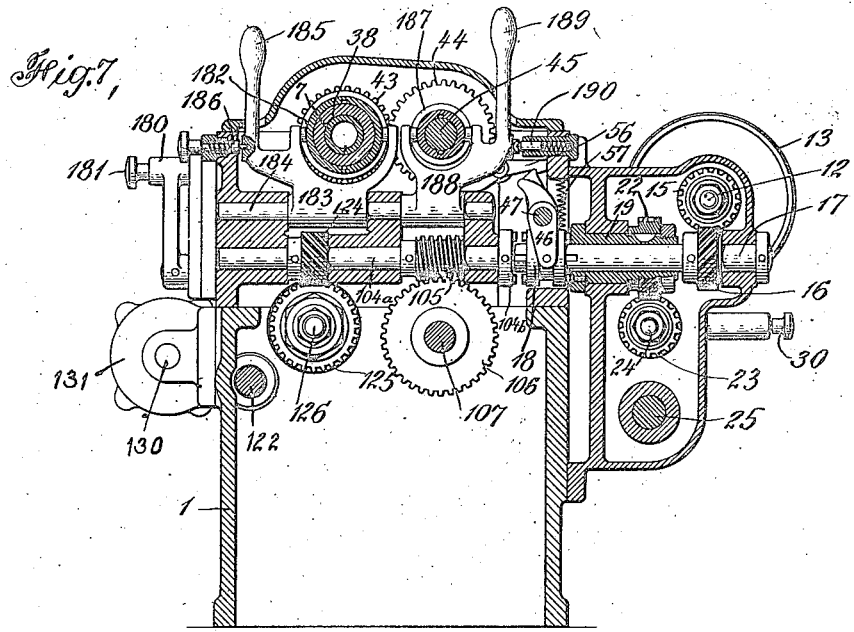
Fig. 7 is a transverse sectional view taken along the line 7—7 of Fig. 3.

Referring to the drawings, 1 represents the main bed frame upon which the other parts of the machine are mounted. As already stated, a machine embodying the invention is primarily intended for making milling cutters or other rotatable tools requiring relief. For carrying and rotating the blanks for such tools, the machine comprises a headstock 2 and preferably a tailstock 3. A cutting mechanism is provided for engaging the blank, this mechanism being indicated as a whole by 4. The tailstock is longitudinally adjustable along ways 5 and 5ᵃ on the bed and a suitable device is provided for locking the tailstock in adjusted position, this locking device being controlled by a hand lever 6. The headstock is provided with a rotatable spindle 7 which is mounted in suitable bearings. At its right-hand end the spindle is provided with means for engaging a work support and, as illustrated, this means comprises a collet chuck 8. The tailstock is provided with a center 9 having its axis in alinement with the axis of the spindle 7. The center is adapted to be controlled by a hand wheel 10 and can be locked in adjusted position by means of a lever 11. It will be understood that the blank to be cut is supported by the chuck 8 and preferably by the center 9. As shown in Fig. 1, there is a blank A which is mounted on a mandrel B. The mandrel is secured in the chuck 8 and is supported at its outer end by the center 9. In securing the mandrel in place care is taken to position the blank with its teeth in proper relation to the cutting mechanism. In the drawings the blank A is illustrated as being a hob having a plurality of helical teeth each extending in a generally longitudinal direction.

At the rear of the machine, as shown most clearly in Figs. 6 and 7, there is mounted a short longitudinal shaft 12 which carries at its outer end belt pulleys 13 and 14. From this shaft power is supplied to operate all parts of the machine, except the cutter. At the inner end of the shaft 12 there is secured a spiral gear 15 which meshes with a spiral gear 16 on a transverse shaft 17.

For rotating the spindle 7 a sleeve 19 is mounted on the shaft 17 and in order that the spindle rotation may be readily started and stopped independently of the shaft 17, the sleeve 19 is loose on the shaft and is adapted to be connected therewith by means of an annularly grooved clutch collar 18 which is splined to the shaft 17 near its inner end. The collar 18 is provided at one side with clutch teeth adapted to engage similar clutch teeth on the sleeve 19. The sleeve 19 carries a spiral gear 22 which meshes with a spiral gear 23 on a short longitudinal shaft 24 at the rear of the machine. Adjacent the shaft 24 and parallel therewith is a shaft 25 and the two shafts 24 and 25 are connected by suitable change-speed gearing. Carried by the shaft 24 is a long spur gear 26 which meshes with a gear 27 carried by a sleeve 28, shown in Fig. 9. The sleeve 28 together with the gear 27 is slidable longitudinally of the gear 26 and is also angularly adjustable. The shaft 25 carries a series of differently diametered gears 29 with any one of which the gear 27 may be brought into engagement. A spring-pressed locking pin 30 is provided for entering holes in the sleeve 28 thus holding it, together with the gear 27, in any position of adjustment. It will be seen by means of the mechanism described the shaft 25 may be rotated from the shaft 24 at any one of several speeds, as desired. At the inner end of the shaft 25 there is secured a bevel gear 31 which meshes with a bevel gear 32 at the lower end of a vertical shaft 33. At its upper end the shaft 33 is connected by bevel gearing 34 to a transverse horizontal shaft 35. The shaft 35 has connected to it a worm 36 which meshes with a worm wheel 37 mounted on the spindle 7 and adapted to drive it.

By preference a sleeve 38 surrounds the spindle 7 and is capable of independent rotation with respect thereto, and the worm wheel 37 is mounted on the sleeve. Preferably, as shown most clearly in Fig. 3, an indexing disk 39 is secured to the spindle 7 adjacent a disk 40 secured to the sleeve 38. The disk 39 is provided with a series of holes 41 through any one of which a threaded pin 42 may be passed to engage a threaded aperture in the flange 40. Four holes are shown but it will be understood that the number may be varied as required. By means of this connection the spindle may be indexed with respect to the sleeve, and when the pin 42 is inserted, as shown, the sleeve and the spindle are connected for rotation as a unit.

The spindle may be rotated continuously but for some classes of work, such as the cutting of annularly grooved hobs, it is desirable to provide means for stopping the spindle after rotation to a predetermined extent. For this purpose I make use of the mechanism now to be described.

Secured to the sleeve 38 is a gear 43 which meshes with a gear 44 on a shaft 45 parallel with the sleeve and spindle. The gear 44 serves as a controlling member for the spindle and it will be observed that it has a few more teeth than the gear 43, the result being that the sleeve and spindle must rotate through a little more than one revolution to cause a complete revolution of the shaft 45. In practice the spindle preferably moves through about one and one-eighth of a revolution for each revolution of the shaft 45. The reason for this will more fully appear hereinafter.

For operating the clutch collar 18 there is provided a forked lever 46 which is mounted on a longitudinal rock shaft 47. As shown most clearly in Fig. 9, the rock shaft 47 carries a double-armed lever 48 which is provided with recesses at opposite sides of the shaft. Pivotally mounted at 48ª on the frame part of the headstock is a rocker 49 carrying a spring-pressed plunger 50 which is provided with a roller 51 adapted to be seated in one or the other of the recesses in the lever 48. The rocker 49 is provided with upward and downward extending arms 52 and 53 each provided at its end with an anti-friction roller. Mounted on the shaft 45 is a cam member 54 having an approximately spiral surface adapted to engage the roller at the end of the arm 52. In operation, the shaft 45 is rotated in the direction indicated by the arrow and the cam 54 moves the rocker to cause the roller 51 to be seated in the upper recess of the lever 48. The pressure of the spring tends to rock the shaft 47 in the clockwise direction and to move the clutch collar 18 out of engagement with the sleeve 19 and thus disconnect the spindle and associated parts from the main drive. Preferably I provide means which prevent the immediate movement of the rock shaft and of the clutch collar upon the shifting of the rocker 49. As illustrated, an upward projecting arm 55 is secured to the rock shaft and this is engaged by a latch 56 pivoted to the frame of the headstock. A spring 57 tends to hold the latch in engagement with the lever. Secured to the shaft 45 is a disk 58 upon which is adjustably mounted a trip 59. After the rocker has been shifted by the cam 54 the shaft 45 continues to rotate until the trip 59 engages the tail of the latch 56 and releases it from the arm 48. Then the spring plunger moves the rock shaft in the clockwise direction and moves the clutch collar 18 out of engagement with the sleeve 19 and stops the spindle. The spindle remains idle until the clutch collar 18 is again engaged with the sleeve 19 in a manner to be presently described.

The cutting mechanism 4 comprises a tool for cutting the blank, and this is preferably a milling cutter as shown at 60. However, as concerns some of its features the invention is not limited to a milling cutter. The machine includes means for effecting relative movement between the tool and the blank longitudinally of the latter. By preference the blank is held against longitudinal movement and the tool is moved along it. In the construction illustrated, the cutting tool is mounted on a carriage 61 which is longitudinally movable along horizontal ways on the main frame. One of these ways may be the aforesaid way 5 and the other is indicated at 62. As shown in Fig. 3, the carriage 61 is provided with transverse ways along which is movable a slide 63, and this slide 63 is provided with ways along which is movable a second slide 64. The slide 64 can be moved with respect to the slide 63 by means of a screw 65 controlled by a hand wheel 66. When the tool 60 is a milling cutter as shown it is mounted on a rotatable spindle carried by a housing 67 which is mounted on brackets 68 and 69 projecting upward from the slide 64. The housing 67 is angularly adjustable about a transverse horizontal axis passing through the center of the cutter. At the rear of the slide 64 there is mounted a housing 70 carrying a belt pulley 71. Suitable gearing within the housings 70 and 67 serves to transmit power from the pulley 71 to the cutter, at the same time permitting angular adjustment of the housing 67 and of the cutter without interfering with the transmission of power. This drive mechanism is well known and does not of itself constitute a part of the present invention and is not therefore described in detail.

Figure 10:
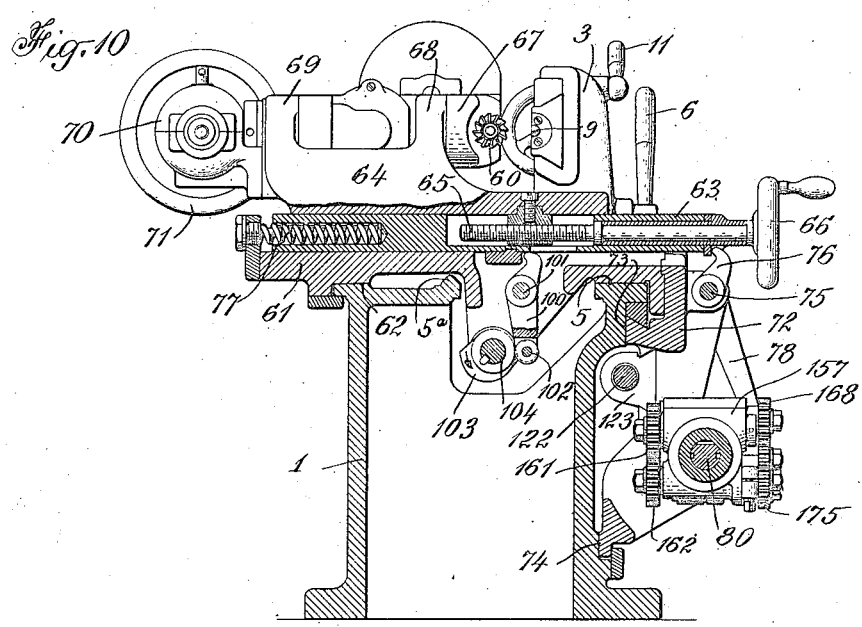
Fig. 10 is a transverse sectional view taken along the line 10—10 of Fig. 3.

For the purpose of cutting a suitable relief on the blank, I preferably provide means for moving the slide 63, with the cutting tool, forward and backward in timed relation to the rotation of the spindle and of the blank. As illustrated, there is provided at the front of the machine an apron 72 which is rigidly connected with the carriage 61 to move longitudinally therewith. The apron is guided by suitable ways 73 and 74 formed on the main frame. Mounted in suitable bearings on the apron 72 is a short rock shaft 75. Secured to this rock shaft is a lever 76 (Fig. 10) which is adapted to engage the slide 63 to move it backward. A spring 77 is provided for moving the slide forward and for holding it in engagement with the lever 76. Connected to the rock shaft 75 is a depending lever 78. The lever 78 engages a cam 79 which is mounted on a longitudinal rotatable shaft 80. The shaft 80 is splined or otherwise constructed so as to be capable of rotating the cam. The cam is ordinarily positioned for rotation in the direction indicated in Fig. 5, but it can be reversed on the shaft when required for a purpose to be presently set forth. The shaft 80 is supported in part by bearing brackets 81 and 82 on the apron 72 and in part by a bearing bracket 83 on the main frame. Means are provided whereby the bracket 83 serves to prevent the shaft 80 from moving longitudinally. The cam 79 while connected to the shaft for rotative movement therewith, is nevertheless longitudinally movable therealong when the carriage 61 and the apron 72 are moved. The cam 79 is so shaped that, when the shaft 80 is rotated, it swings the lever 78 in the proper manner to cause the movement of the slide 63 and of the cutting tool 60 to effect the desired relief on the blank.

Obviously the shaft 80 and the cam must be turned in the proper timed relation with the movement of the spindle and of the blank so as to effect the required number of relieving movements for each revolution. I have shown a blank having six generally longitudinal teeth with grooves between them, and in this case therefore the cutter must be given six relieving movements for each revolution of the blank. The mechanism shown for rotating the shaft 80 comprises a gear 84 secured to the front end of the shaft 35. This gear meshes with a gear 85 at the rear end of a short transverse horizontal shaft 86 which is rotatably mounted in a bracket 87 carried by the headstock casting. At the front end of the shaft 86 is a gear 88. At the left-hand end of the shaft 80 there is secured a worm wheel 89 which meshes with a worm 90 on a short transverse horizontal shaft 91 preferably carried by the same bracket 83 which assists in supporting the shaft 80. At the front end of the shaft 91 is mounted a gear 92. Rotatably mounted on the bracket 87 is an arm 93 having slots 94 and 95. Slidably mounted in these slots are studs 96 and 97 upon which are rotatably mounted gears 98 and 99. As shown, the gear 98 meshes with the gear 88 and with the gear 99, and the gear 99 in turn meshes with the gear 92. By means of this gearing the shaft 80 is rotated whenever the spindle 6 is rotated. The arm 93 may be clamped in adjusted position to hold the gears in engagement by means of a clamping screw 93ª. It will be understood that one or the other or both of the gears 88 and 92 can be removed and other gears of different sizes substituted therefor in order to change the speed ratio between the spindle 6 and the shaft 80. It is sometimes desirable as will presently appear, to reverse the direction of rotation of the shaft 80. This is effected by removing the gear 98 and moving the gear 99 into mesh with the gear 88.

Assuming the clutch collar 18 to be moved to the position shown in Fig. 7, the spindle and the blank will be rotated through a little more than one complete revolution, the movement continuing until the shaft 45 has made a complete revolution. Then the clutch collar 18 is automatically moved in the way already described out of engagement with the sleeve 19 and the rotation of the spindle is stopped. By means of the gearing which has been described, the cam 79 is rotated in timed relation to the rotation of the spindle, thus effecting the required number of relieving movements of the cutting tool 60. In the present instance there are six such relieving movements for each complete rotation of the spindle.

For cutting hobs or for cutting any tool having a length greater than the width of the cutting tool, means are provided for automatically moving the tool longitudinally of the blank. The tool may be moved continuously, but under many circumstances it is preferable to move the tool intermittently. The intermittent movement is particularly adapted for cutting hobs such as described and it is then necessary, after the movement of the spindle through a little more than one revolution, as described, to move the carriage 61 sufficiently to position the tool for the cutting of another set of grooves in the blank.

Preferably the relative positions of the tool and the cutter are so controlled that the cutter is out of contact with the blank whenever one of the longitudinal feeding movements takes place. This relationship of the tool out of contact with the blank can be brought about in different ways, but preferably the tool is moved backward out of engagement with the blank. As illustrated, this backward movement is effected by means of a lever 100 which is pivotally mounted on the carriage at 101. The upper end of the lever is adapted to engage a depending projection on the slide 63. The lower end of the lever is provided with a roller 102 which is engaged by a cam 103 splined on a longitudinal rotatable shaft 104. The cam is engaged by the carriage in such a way as to be longitudinally movable therewith.

For turning the shaft 104 I make use of a shaft 104ª which is in alinement with the shaft 17 and which carries a clutch collar 104ᵇ adapted to be engaged by the aforesaid clutch collar 18 when it is disengaged from the sleeve 19. When the clutch collar 18 is shifted to stop the rotation of the spindle in the way already described, it engages the collar 104ᵇ and immediately starts the rotation of the shaft 104ª. Secured to the shaft 104ª is a worm 105 which meshes with a worm wheel 106 on a longitudinal horizontal shaft 107. The shaft 107 carries a cam member 108, clearly shown in Fig. 8, which engages a roller 109 at the lower end of a rocker 110. This rocker is pivoted to the headstock casting at 111 and is provided with gear teeth at 112. These gear teeth engage a segmental gear 113 which is mounted on a longitudinal pivot stud 114 carried by the headstock casting. Also carried by the pivot stud 114 and connected with the segmental gear 113 is a second segmental gear 115 which meshes with a pinion 116 secured to the shaft 104. As soon as the shaft 104ª starts to rotate the cam member 108 is turned in the direction indicated by the arrow in Fig. 8 and swings the rocker 110 upward. The upward movement of the rocker causes the two segmental gears 113 and 115 to turn in the clockwise direction, thus rotating the shaft 104 in the counter-clockwise direction as indicated by the arrow in Fig. 10. The cam 103 engages the roller 102, thus swinging the lever 100 in the counter-clockwise direction and moving the slide 63 backward to carry the cutter 60 out of engagement with the blank.

For moving the carriage 61, I provide a lead screw 122 which is fixed against longitudinal movement. The lead screw has threaded engagement with a member 123 carried by the apron 72. For turning the screw 122 to move the cutting tool from one set of grooves to another I provide a mechanism which is operated by the shaft 104ª. The shaft 104ª is provided with a helical gear 124 which meshes with a helical gear 125 on a longitudinal horizontal shaft 126. The shaft 126 carries at its outer end a gear 127. As shown in Fig. 11 the lead screw 122 carries at its left-hand end a gear 128 which meshes with a gear 129 carried by a short longitudinal shaft 130. The shaft 130 is mounted in a housing 131 carried by the main frame and is provided at its outer end with a gear 132. Mounted for pivotal movement about the axis of the shaft 130 is an arm 133 having a slot 134. Adjustably mounted in the slot 134 is a bearing stud 135 upon which is mounted an idler gear 136 meshing with the aforesaid gears 127 and 132. By means of a clamping screw 137 the arm 133 can be secured in position to hold the gears in mesh. It will be seen that the mechanism which I have described is adapted for transmitting rotative movement from the shaft 104ª to the lead screw 122.

In order that the lead screw 122 may be given a definite predetermined amount of rotative movement, I provide a disk 138 which is secured to the shaft 126 adjacent the gear 127. This disk is provided at 139 with a notch adapted to be engaged by a spring-pressed plunger 140 carried by the main frame. The plunger 140 is provided with a pin 141 which is engaged by one arm of a bell-crank lever 142 pivoted to the frame at 143. The other arm of the lever extends upward at 144 and carries a roller at 145 which is engaged by a cam member 146 carried by the left-hand end of the shaft 107. At the upper end of the bell-crank lever is a handle 147. The helical gear 125 is not rigidly secured to the shaft 126 but is frictionally connected thereto. As shown, there is a flanged sleeve 148 which is adapted to be rigidly secured to the shaft, and interposed between the flange of the sleeve and the helical gear is a friction disk 149. A plate 150 engages the friction disk 149 and is connected to the helical gear by means of pins. Coil springs 151 press the plate 150 against the friction disk 149, thus insuring a frictional connection between the helical gear and the sleeve 148.

When the shaft 104ª is started in the way before described, the helical gear 125 is immediately rotated, but inasmuch as the shaft 126 is locked by means of the plunger 140, slipping takes place at the friction connection. The shaft 107 also begins to rotate, as before described, and the cam member 146 on this shaft comes into contact with the roller 145 on the bell-crank lever which engages the pin 141 and moves the plunger 140 downward out of the notch in the disk 138. The shaft 126 is thus released for movement and starts to rotate under the influence of the friction connection. It will be understood that the shaft 126 is released only after the cutting tool 60 has been withdrawn as before described. Through the gearing described, the shaft 126 causes the rotation of the lead screw 122 and thereby causes the movement of the apron 72 and of the carriage 61. This movement continues until the shaft 126 has made a complete revolution, whereupon the plunger 140 again enters the notch 139, the cam member 146 by this time having moved out of engagement with the roller 145. The re-engagement of the plunger 140 with the disk 138 serves not only to stop the movement of the shaft 126 and of the several parts driven thereby, but also serves to positively lock these parts in a definite position. After the shaft 126 is stopped, the helical gear 125 may continue to rotate, slipping taking place at the friction connection.

It will be understood that the mechanism described serves to move the carriage 62 and the cutting tool 60 a definite predetermined distance longitudinally. The amount of movement may be changed as required by removing one or the other or both of the gears 127 and 132 and substituting other gears of different diameters. The gear 136 and the arm 133 are movable to permit the gear 136 to mesh with gears 127 and 132 of any desired diameters.

Figure 9:
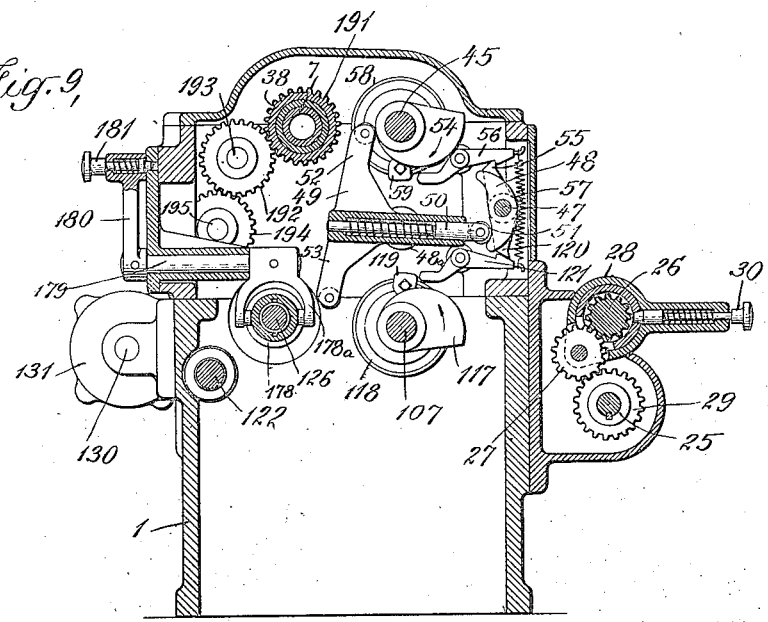
Fig. 9 is a transverse sectional view taken along the line 9—9 of Fig. 3.

After the cutting tool has been withdrawn and then moved longitudinally as described by mechanism driven from the shaft 104ª, the said shaft must be stopped and the rotation of the spindle 7 again started. For this purpose there is mounted on the shaft 107, as shown in Fig. 9, a cam member 117 which is shaped similarly to the cam member 54 on the shaft 45. This cam member is adapted to engage the roller at the lower end of the arm 53 of the rocker 49 and to swing the rocker in the clockwise direction, thus moving the roller 51 from the upper recess of the lever 48 to the lower recess. The shaft 107 carries a disk 118 which is similar to the disk 58 on the shaft 45 and adjustably secured to this disk is a trip 119 similar to the trip 59. The rock shaft 47 carries a downward projecting arm 120 similar to the arm 55, and a latch 121 similar to the latch 56 is pivotally mounted in position to engage the arm 120. Preferably the spring 57 already referred to is also connected to the latch 121 and thus tends to move both of the latches into operative positions. The trip 119 is adapted to engage the tail of the latch 121 at the proper time to release the latch from engagement with the arm 120. As shown in Fig. 9, it is assumed that the rocker 49 has been moved to the position shown by the cam member 117 on the preceding rotation of the shaft 107. The trip 119 has just released the latch from the arm 20 and the plunger 50 has just moved the rock shaft 47 in the direction to disengage the clutch collar 18 from the shaft 21 and engage it with the sleeve 19. The shaft 107 has therefore been stopped in the position shown and the shaft 45 with the spindle and other associated parts have just started operation. The continued movement of the shaft 45 and the cam 54 from the position shown in Fig. 9 will swing the rocker arm to engage the roller 51 with the upper notch in the arm 48. Afterward, when the shaft 45 has made a complete revolution, the trip 59 will engage the latch 56 and release the arm 55, thus causing the clutch collar 18 to be again shifted in the way which has already been fully described. Thus each of the shafts 45 and 107 serves to disconnect itself after a complete revolution and to start the rotation of the other shaft.

The driving mechanism herein shown and described comprising the rocker and associated parts for operating the clutch 18, does not of itself constitute a part of my present invention, it being set forth and claimed in my Patent No. 1,273,903 for driving mechanism, dated July 30th, 1918.

Figure 8:
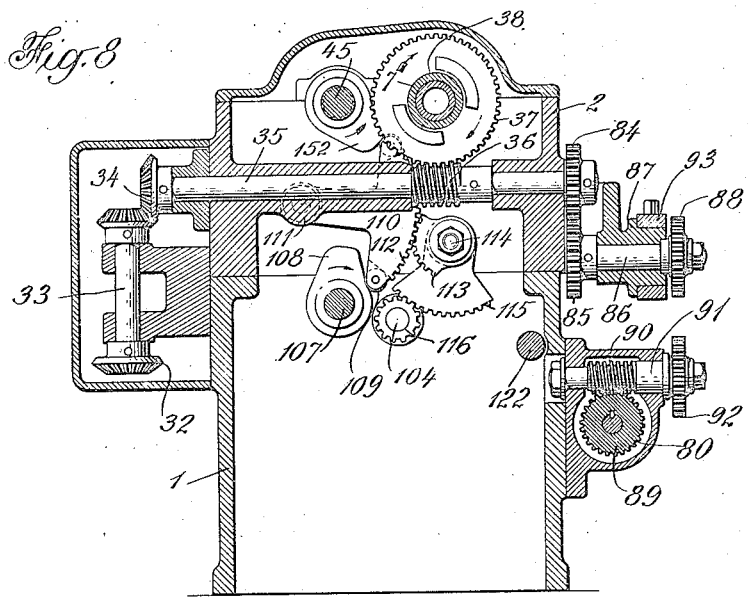
Fig. 8 is a transverse sectional view taken along the lines 8—8 of Figs. 3 and 6.

After the cutting tool has been moved longitudinally in the way described, it must next be moved forward in order to properly engage the blank. It will be recalled that the tool was moved rearward by means of the lever 100 and the cam 103 which were operated by the rocker 110 and the cam member 108 on the shaft 107. In order to return the tool to its operative position the rocker 110 and the several parts connected thereto, including the cam member 103 and the lever 100, must be moved in the reverse direction. This is preferably accomplished by mechanism driven by the spindle 7 thus insuring the advance of the tool in proper relation to the starting of the spindle. The mechanism comprises a cam 152 secured to the shaft 45. This shaft rotates in the direction indicated by the arrow in Fig. 8 and the cam member engages the roller at the upper end of the rocker 110 and forces the rocker downward. Fig. 8 shows the position of the parts just as the cam 152 has completed the downward movement of the rocker. The rocker has turned the cam 103 in the direction opposite to that indicated by the arrow in Fig. 10 and the spring 77 has been permitted to return the cutting tool 60 to its forward operative position.

The proportion of the several parts is such that the tool is moved forward relatively slowly. One reason for the relatively slow return movement is to permit the tool, if necessary, to cut its way into the blank to the maximum depth. In view of the fact that the spindle and the blank are at each actuation rotated through a little more than a complete revolution, the blank may be in any angular position with respect to the cutting tool as the tool advances. On one occasion the tool may advance into one of the grooves between two teeth and on another occasion the tool may engage one of the teeth and be forced to cut the circumferential groove to the maximum depth. As stated, the lever 100 is so controlled that it causes the tool to be moved slowly forward, cutting its way as it goes, if necessary. This forward movement of the tool continues until the slide 63 engages the lever 76. Thereafter the slide is controlled entirely by the lever 76 which effects the relieving movements, the lever 100 remaining inoperative until it is time for the tool to be again withdrawn.

During the slow forward movement of the cutting tool as above described, the blank is in rotation and the result may be that a groove which is too shallow may be cut for a short distance; but, as already stated, the rotation of the blank is continued through a little more than a complete revolution, thus enabling the tool to again engage the blank at the initial points and cut the groove to the normal depth.

Preferably, in order that the position of the circumferential grooves to be cut may be properly determined with reference to the blank, I provide means whereby the cutting tool 60 may be moved longitudinally of the blank independently of the lead screw. As shown in Fig. 12, the member 123 is not fixedly secured to the apron 72 but is in the form of a slide longitudinally adjustable with respect to the apron. For effecting relative longitudinal adjustment of the slide I provide a screw 153, and for clamping the slide in adjusted position there I provide two screws 154 which engage a gib 155. By means of this mechanism it is possible to move the carriage longitudinally to properly position the cutting tool with respect to the blank.

As stated at the outset, one of the important objects of the invention is to provide a machine which is adapted for cutting hobs having their longitudinal teeth formed helically instead of straight as has heretofore been usual. In order that such a hob may be cut, it is necessary to provide means whereby the relation between the relieving movements of the cutting tool and the rotation of the blank are changed for each set of circumferential grooves. The amount of change must vary with the pitch of the grooves and with the degree of inclination of the teeth. In order that the relation of the relieving movements may be thus changed automatically and without any attention from the operator, I provide the mechanism which will now be described.

Preferably the required change of relation between the blank and the cam is effected by relatively moving the cam angularly in proportion to the longitudinal movement of the tool along the blank, without changing or modifying the blank rotation; but, as concerns certain features of the invention, I do not limit myself in this respect, as the change of relation can be otherwise effected. The cam 79 is not directly splined to the shaft 80 but is connected therewith by means of bodily rotatable gearing. Preferably this gearing is mounted on the shaft 80 and is bodily movable therealong when the carriage and tool are moved. As illustrated, the cam 79 is secured to a sleeve 156 which is rotatable with respect to the shaft 80. This sleeve rotatively engages the bearing bracket 82 on the apron 72. Splined to the shaft 80 is a sleeve or frame 157 which rotatably engages the bearing bracket 81 on the apron 72. At its right-hand end the sleeve 157 extends over and surrounds the left-hand end of the sleeve 156, as clearly shown in Fig. 17. The mechanism for changing the relieving relationship preferably includes a rack and pinion relatively movable in proportion to the longitudinal movement between the tool and the blank. Preferably the pinion forms a part of the aforesaid bodily rotatable gearing. As illustrated, the shaft 80 is formed with a longitudinal series of rack teeth 158 which are engaged by a pinion 159 on a short transverse shaft 160 rotatably mounted in the sleeve or frame 157. At one end of the shaft 160 is a gear 161 which meshes with a gear 162 on a short shaft 163 also rotatably mounted in the frame 157. At the end of the shaft 163 opposite to the gear 162 is a gear 164. A third transverse shaft 165 is rotatably mounted in the frame 157 and this shaft carries a worm 166 which meshes with worm teeth 167 formed on the left-hand end of the sleeve 156. The shaft 165 carries a gear 168 which is at the same side of the frame as the gear 164. Mounted for movement about the axis of the shaft 163 is an arm 169 provided with slots 170 and 171. Adjustably mounted in the slots 170 and 171 are studs 172 and 173 on which are mounted gears 174 and 175. The gear 175 meshes with a gear 164 and also with the gear 174, and the gear 174 in turn meshes with the gear 168. The arm 169 can be clamped in position to hold the gears in engagement by means of a clamping screw 176.

When the apron 72 is moved longitudinally with the carriage 61 the frame 157 is moved longitudinally along the shaft 80. The gear 159 rolls along the rack 158 and its rotative movement is transmitted through the gearing described, to the shaft 165 and the worm 166. The rotation of the worm 166 serves to turn the sleeve 156 and thus change the position of the cam 79 with respect to the shaft 80. It will be seen that this adjustment of the cam takes place automatically whenever the carriage and the apron are moved and is exactly proportional to the extent of movement. The connections which have been described do not interfere in any way with the normal rotative movement of the cam with the shaft, it being understood that the entire mechanism, including the two sleeves 156 and 157 and the several parts carried thereby, are bodily rotatable. It will be observed that while the entire mechanism, including the gearing and other parts, is both longitudinally movable and bodily rotatable the several gears have no movement relative to each other except the before described movement which is proportional to the extent of feed. The ratio of the gearing is such that the cam 79 is relatively turned to the exact extent which is necessary in accordance with the angle of the spiral of the flutes of the blank. When a blank is to be cut having teeth conforming to different helices, one or the other or both of the gears 164 and 168 are removed and other gears having different diameters are substituted. The gears 174 and 175 are properly moved to mesh with these differently diametered gears. In this way the machine can be adapted for the cutting of blanks having teeth conforming to any desired helices. It will be noted that this change for blanks with different helices is effected without changing or modifying the shaft 80 which drives the cam.

When a blank is to be cut having teeth which are inclined oppositely from those shown, the gearing connection between the rack 158 and the cam 79 is reversed. This may be done by removing the gear 175 and substituting for the gear 174 a larger gear which will mesh with both of the gears 164 and 168.

In order that the carriage may be easily moved preliminarily to bring the cutting tool into approximately its operative position, I provide means whereby the lead screw 122 may be turned manually. As illustrated, the shaft 130 is provided with a squared end to which may be applied a crank. Normally the spring plunger 140 locks the lead screw against turning but the plunger may be withdrawn by moving the bell-crank lever by means of the handle 147. When the plunger has been thus withdrawn the operator can turn the crank and move the lead screw to any desired extent. After the tool has been thus moved longitudinally to approximately the desired position, the plunger 140 is again seated in the notch 130 and additional movement of the carriage and the tool may be obtained by means of the adjusting screw 153.

Preferably, in order that the manual movement above described may be effected without undue effort, I provide means for disconnecting the friction device at 149. As illustrated, the sleeve 148 is not fixedly secured to the shaft 126 but is connected therewith by means of an annularly grooved clutch collar 178 which is splined to the shaft. As shown most clearly in Fig. 9, the clutch collar 178 is engaged by projections on a forked lever 178ª which is mounted on a transverse rock shaft 179. At the front of the machine the rock shaft 179 carries a hand lever 180 which at its upper end is provided with a spring-pressed detent 181 adapted to enter one or the other of two apertures formed in the front of the headstock. By means of the lever 180 the clutch collar can be moved and by means of the detent it can be held either in its operative or in its inoperative position. When the sleeve 148 is thus disconnected from the shaft 126 the shaft may be turned freely with the lead screw without overcoming the resistance of the frictional connection.

After the blank has been mounted in the way already described, and after the cutting tool 60 has been adjusted longitudinally to the proper position, the tool is moved forward by means of the slide 64 and the hand wheel 66 into position to cut grooves of the proper depth in the blank. After the tool has been thus properly adjusted the rotation of the spindle is started, the tool being simultaneously given its forward and rearward relieving movements.

Preferably, in order that the spindle may be stopped and started independently of the other parts of the machine, the worm wheel 37 is loosely mounted on the sleeve 38. Splined to the sleeve adjacent the worm wheel is an annularly grooved clutch collar 182 having clutch teeth adapted to mesh with clutch teeth on the worm wheel 37. The clutch collar 182 is adapted to be moved by means of a forked lever 183 which is pivotally mounted at 184 and which has connected to it a hand lever 185. Preferably there is a spring-pressed detent 186 which is adapted to engage the lever 185 and yieldably hold it with the clutch collar either in its operative position or in its inoperative position. By preference, as shown in Fig. 8, the projections on the worm wheel 38 are non-symmetrically arranged so that they can engage the clutch collar in but one position. This insures a definite relation between the spindle and the cam shaft 80.

It may sometimes happen that when the spindle is first started the shaft 45 is in such a position as to stop the rotation before the blank has made a complete revolution. To prevent the automatic movement of the cutting tool to a new position under such circumstances, the operator, preferably before starting the spindle, moves the clutch collar 178 out of engagement with the sleeve 148, thus disconnecting the devices which normally serve to move the tool longitudinally. The tool is moved rearward in the usual way but is returned to the original position so that it can complete the cutting of the first set of grooves.

After the cutting tool has been moved into engagement with the blank for the second time, the operator engages the clutch collar 177 with the sleeve 148 and thereafter the operation continues in the normal manner. After each set of grooves has been completed, the blank having rotated through a little more than a complete revolution, the rotation of the blank is stopped and the devices which move the tool are set in operation. The tool is first moved rearward and is then moved longitudinally for a distance corresponding to the pitch of the grooves. Then the tool moving devices are thrown out of operation and the spindle is again started. The cam 152 connected with the spindle serves to slowly return the tool forward into operative engagement with the blank. These operations are repeated in sequence until the blank is completely cut.

The machine can also be used for cutting hobs having their cutting teeth facing in the opposite direction from that shown in Fig. 1. The construction of the cams 54 and 117 and associated parts is such that the spindle cannot be reversed, and I therefore reverse the position of the cam 79 on the shaft 80. Otherwise the operation is the same as heretofore described. When the cam is in the position shown in Fig. 5, the tool is moved rapidly backward to its outermost position immediately before its engagement with each land, and is then moved slowly forward to effect the required relief. When the cam is reversed the tool is moved rapidly forward to its innermost position immediately before its engagement with each land, and is then moved slowly outward to effect the desired relief. The same result can be obtained, if preferred, by rotating the cam in the opposite direction. This is done by removing the gear 98 and moving the gear 97 into mesh with the gears 88 and 92.

The machine as thus far described is well adapted for carrying out the method set forth in my patent for method of making thread milling hobs, No. 1,348,305, dated August 3, 1920. A hob such as may be made is set forth and claimed in my patent for thread milling hobs, No. 1,348,304, dated August 3, 1920.

In order that the machine may be used for cutting blanks having straight longitudinal grooves, I provide means for locking the two sleeves 156 and 157 together so that no relative movement can take place. This means comprises a bolt 177 which is adapted to clamp the parts of the sleeve 157 against the sleeve 156. It will be understood that when the two sleeves are thus clamped together the gear connection is interrupted preferably by moving the arm 169 to bring the gears 174 and 168 out of mesh.

While the machine is primarily intended for the cutting of hobs having annular teeth with annular grooves between them, the machine may also be used for cutting hobs having inclined or helical teeth. When hobs of this latter class are to be cut the alternate intermittent movements of the spindle and of the carriage cannot be used and both the spindle and the carriage must be moved continuously in timed relation as is usual in the cutting of screw threads. In order that this continuous movement may be obtained, I provide means for throwing out of operation the devices which ordinarily stop the rotation of the spindle after a predetermined movement. As illustrated, the gear 44 is not fixedly secured to the shaft 45 but is connected thereto by means of an annularly grooved clutch collar 187 which is splined to the shaft 45 and which has teeth adapted to mesh with similar teeth on the gear. For moving the clutch collar 187 there is provided a forked lever 188 having projections adapted to enter the groove of the collar. The lever 188 carries a handle 189 by means of which it may be moved to carry the collar into or out of operative position. Associated with the lever 188 is a spring-pressed plunger 190 which serves to hold the lever in one or the other of its extreme positions. When the clutch collar 188 is disconnected from the gear 44, the gear can rotate idly on the shaft 45 which does not rotate. The clutch collar 18 remains in engagement with the sleeve 19 and the spindle is continuously driven.

For turning the lead screw at a rate which is definitely proportioned to the rate of turning of the spindle, I provide a train of gearing supplemental to that heretofore described. Mounted on the spindle near the outer end thereof is a gear 191 which meshes with an idler gear 192 carried by a stud 193. The gear 192 meshes with a gear 194 on a short longitudinal shaft 195 which is rotatably mounted in the headstock casting. The outer end of the shaft 195 is adapted to have secured to it the gear 127 which has heretofore been described as secured to the shaft 126. When the gear 127 is mounted on the shaft 195 the arm 133 is swung upward to bring the gear 136 into engagement with the gear 127 in its new position. The connections between the shaft 130 and the lead screw remain as before described and the result is that the lead screw is connected directly with the spindle for continuous rotation in timed relation thereto. The shaft 195, which is operatively connected to the spindle 7, is rotated directly in accordance with the rotation of the work. The gearing connection between the spindle and shaft 195 operates such shaft at a very slow speed as compared with the rotation of the shaft 126. The speed ratio between the spindle and the lead screw may be changed for cutting threads of different pitches by removing one or the other or both of the gears 127 and 132 and substituting other gears of different diameters, as before described.

It will be understood that when a milling cutter such as 60 is used for cutting hobs with helical circumferential teeth it is or may be inclined by adjusting the housing 67 so that the angle of the cutter corresponds with the pitch angle of the teeth.

The hobs formed with spiral cutting teeth may have either straight or helical longitudinal teeth and grooves as required, and in the case of helical teeth and grooves the mechanism for relatively adjusting the cam 79 operates as before described. In the case of straight teeth and grooves the mechanism for relatively adjusting the cam is disconnected.

For preliminarily moving the cutting tool into the proper operative position the lead screw 122 may be turned manually, as before described. In order that this may be done the clutch collar 182 is disconnected from the worm wheel 37.

For cutting inclined grooves with a left-hand pitch the spindle is reversed, preferably by crossing the drive belt on the drive pulley. At the same time the tool is reversed. In the case of a milling cutter such as 60, it is reversed on its spindle and is driven in the opposite direction, the angle of the cutter being changed to correspond to the changed angle of the grooves. If the teeth are to face in the same direction as before, the direction of rotation of the cam 79 must not be reversed. Therefore the gearing at 98—99 must be changed so that the shaft 80 will rotate in the same direction as before.

In forming hobs it is frequently desirable to have the grooves in the form of multiple threads. In other words, it is desirable to have the inclination of the grooves such that the longitudinal movement represented by a complete revolution is an even multiple of the desired distance between two adjacent grooves. For cutting such multiple grooves it is necessary to index the spindle with the blank. This is done by removing the pin 42 and then turning the spindle so that the pin can be seated in the next aperture. This indexing operation is repeated until all of the multiple grooves have been cut. As illustrated, the index disk 39 has four apertures, but it will be understood that the number of apertures can be varied in accordance with the number of multiple grooves to be cut.

Certain broad or basic features of invention herein disclosed, particularly those relating to the intermittent feeding of the tool and the withdrawal thereof, are not claimed as a part of the present invention, these features being presented in my copending application for mechanical movement, Serial No. 399,715, filed June 29, 1920. The said application, as to some of its subject matter, constitutes a continuation in part of the present application.

What I claim is:

1. The combination in a relieving machine, of a rotatable blank-carrying spindle, a cutting tool, mechanism for effecting relative movement between the tool and the blank longitudinally of the latter, mechanism for effecting relieving movements of the tool in timed relation to the blank rotation, and mechanism including a rack and a pinion relatively movable in proportion to the said longitudinal movement between the tool and blank for varying the relation between the relieving movements of the tool and the rotative movement of the blank.

2. The combination in a relieving machine, of a rotatable blank-carrying spindle, a cutting tool, mechanism for moving the tool longitudinally of the blank, mechanism for effecting relieving movements of the tool in timed relation to the blank rotation, and mechanism including a rack and a pinion relatively movable in proportion to the said longitudinal movement of the tool for varying the relation between the relieving movements of the tool and the rotative movement of the blank.

3. The combination in a relieving machine, of a rotatable blank-carrying spindle, a cutting tool, mechanism for effecting relative feeding movement between the tool and the blank longitudinally of the latter, mechanism for effecting relieving movements of the tool in timed relation to the blank rotation, and mechanism including a rack and a pinion relatively movable in proportion to the longitudinal movement between the tool and blank for varying the relation between the relieving movements of the tool and the rotative movement of the blank at any one of a plurality of rates.

4. The combination in a relieving machine, of a rotatable blank-carrying spindle, a cutting tool, mechanism for effecting relative feeding movement between the tool and the blank longitudinally of the latter, mechanism for effecting relieving movements of the tool in timed relation to the blank rotation, and mechanism including a rack and a pinion relatively movable in proportion to the longitudinal movement between the tool and blank for either advancing or retarding the relieving movements of the tool with respect to the rotative movement of the blank to conform to either right-hand or left-hand helical teeth on the blank.

5. The combination in a relieving machine, of a rotatable blank-carrying spindle, a cutting tool, mechanism for effecting relative movement between the tool and the blank longitudinally of the latter, mechanism for effecting relieving movements of the tool in timed relation to the blank rotation, and bodily rotatable gearing for varying the relation between the relieving movements of the tool and the rotative movement of the blank.

6. The combination in a relieving machine, of a rotatable blank-carrying spindle, a cutting tool, mechanism for moving the tool longitudinally of the blank, mechanism for effecting relieving movements of the tool in timed relation to the blank rotation, and bodily rotatable gearing for varying the relation between the relieving movements of the tool and the rotative movement of the blank.

7. The combination in a relieving machine, of a rotatable blank-carrying spindle, a cutting tool, mechanism for effecting relative feeding movement between the tool and the blank longitudinally of the latter, mechanism for effecting relieving movements of the tool in timed relation to the blank rotation, and bodily rotatable gearing for varying the relation between the relieving movements of the tool and the rotative movement of the blank at any one of a plurality of rates.

8. The combination in a relieving machine, of a rotatable blank-carrying spindle, a cutting tool, mechanism for effecting relative feeding movement between the tool and the blank longitudinally of the latter, mechanism for effecting relieving movements of the tool in timed relation to the blank rotation, and bodily rotatable gearing for either advancing or retarding the relieving movements of the tool with respect to the rotative movement of the blank to conform to either right-hand or left-hand helical teeth on the blank.

9. The combination in a relieving machine, of a rotatable blank-carrying spindle, a cutting tool, mechanism for effecting relative movement between the tool and the blank longitudinally of the latter, mechanism for effecting relieving movements of the tool in timed relation to the blank rotation, and longitudinally movable gearing operable in proportion to the said longitudinal movement between the tool and blank for varying the relation between the relieving movements of the tool and the rotative movement of the blank.

10. The combination in a relieving machine, of a rotatable blank-carrying spindle, a cutting tool, mechanism for moving the tool longitudinally of the blank, mechanism for effecting relieving movements of the tool in timed relation to the blank rotation, and longitudinally movable gearing operable in proportion to the said longitudinal movement of the tool for varying the relation between the relieving movements of the tool and the rotative movement of the blank.

11. The combination in a relieving machine, of a rotatable blank-carrying spindle, a cutting tool, mechanism for effecting relative feeding movement between the tool and the blank longitudinally of the latter, mechanism for effecting relieving movements of the tool in timed relation to the blank rotation, and longitudinally movable gearing operable in proportion to the longitudinal movement between the tool and blank for varying the relation between the relieving movements of the tool and the rotative movement of the blank at any one of a plurality of rates.

12. The combination in a relieving machine, of a rotatable blank-carrying spindle, a cutting tool, mechanism for effecting relative feeding movement between the tool and the blank longitudinally of the latter, mechanism for effecting relieving movements of the tool in timed relation to the blank rotation, and gearing longitudinally movable in proportion to the longitudinal movement between the tool and blank for either advancing or retarding the relieving movements of the tool with respect to the rotative movement of the blank to conform to either right-hand or left-hand helical teeth on the blank.

13. The combination in a relieving machine, of a rotatable blank-carrying spindle, a cutting tool, mechanism for effecting relative movement between the tool and the blank longitudinally of the latter, mechanism for effecting relieving movements of the tool in timed relation to the blank rotation, and mechanism including a bodily rotatable rack and a pinion relatively movable in proportion to the said longitudinal movement between the tool and blank for varying the relation between the relieving movements of the tool and the rotative movement of the blank.

14. The combination in a relieving machine, of a rotatable blank-carrying spindle, a cutting tool, mechanism for effecting relative movement between the tool and the blank longitudinally of the latter, mechanism for effecting relieving movements of the tool in timed relation to the blank rotation, and bodily rotatable gearing longitudinally movable in proportion to the said longitudinal movement between the tool and blank for varying the relation between the relieving movements of the tool and the rotative movement of the blank.

15. The combination in a relieving machine, of a rotatable blank-carrying spindle, a cutting tool, mechanism for effecting relative feeding movement between the tool and the blank longitudinally of the latter, mechanism for effecting relieving movements of the tool in timed relation to the blank rotation, and mechanism including a rack and a pinion and other gearing longitudinally movable with respect to the rack in proportion to the longitudinal movement between the tool and blank for varying the relation between the relieving movements of the tool and the rotative movement of the blank.

16. The combination in a relieving machine, of a rotatable blank-carrying spindle, a cutting tool, mechanism for effecting relative feeding movement between the tool and the blank longitudinally of the latter, mechanism for effecting relieving movements of the tool in timed relation to the blank rotation, and mechanism including a rack and a pinion and other gearing longitudinally movable with respect to the rack in proportion to the longitudinal movement between the tool and blank for varying the relation between the relieving movements of the tool and the rotative movement of the blank, the said rack and gearing being bodily rotatable.

17. The combination in a relieving machine, of a rotatable spindle adapted to rotate a blank at a fixed uniform speed, a cutting tool, mechanism for effecting relative feeding movement between the tool and the blank longitudinally of the latter, mechanism for effecting relieving movements of the tool in timed relation to the blank rotation, and mechanism for varying the timed relation between the rotative movement of the blank and the relieving movements of the tool, the said mechanism comprising a shaft, two relatively rotatable sleeves mounted on the shaft, a rack carried by the shaft, gearing meshing with the rack and connecting the two sleeves and means for effecting relative movement between the rack and the gearing to turn one sleeve relatively to the other.

18. The combination in a relieving machine, of a rotatable spindle adapted to rotate a blank at a fixed uniform speed, a cutting tool, mechanism for effecting relative feeding movement between the tool and the blank longitudinally of the latter, mechanism for effecting relieving movements of the tool in timed relation to the blank rotation, and mechanism for varying the timed relation between the rotative movement of the blank and the relieving movements of the tool, the said mechanism comprising a shaft, two relatively rotatable sleeves mounted on the shaft, a rack carried by the shaft, interchangeable gearing meshing with the rack and connecting the two sleeves and means for effecting relative movement between the rack and the gearing to turn one sleeve relatively to the other.

19. The combination in a relieving machine, of a rotatable spindle adapted to rotate a blank at a fixed uniform speed, a cutting tool, mechanism for effecting relative feeding movement between the tool and the blank longitudinally of the latter, mechanism for effecting relieving movements of the tool in timed relation to the blank rotation, and mechanism for varying the timed relation between the rotative movement of the blank and the relieving movements of the tool, the said mechanism comprising a shaft, two relatively rotatable sleeves mounted on the shaft, a rack carried by the shaft, gearing meshing with the rack and including a worm on one sleeve and a worm wheel on the other and means for effecting relative movement between the rack and the gearing to turn one sleeve relatively to the other.

20. The combination in a relieving machine, of a rotatable spindle adapted to rotate a blank at a fixed uniform speed, a cutting tool, mechanism for effecting relative feeding movement between the tool and the blank longitudinally of the latter, mechanism for effecting relieving movements of the tool in timed relation to the blank rotation, and mechanism for varying the timed relation between the rotative movement of the blank and the relieving movements of the tool, the said mechanism comprising a shaft, two relatively rotatable sleeves mounted on the shaft, a rack carried by the shaft, disengageable gearing meshing with the rack and connecting the two sleeves, means for effecting relative movement between the rack and the gearing to turn one sleeve relative to the other and means for clamping the two sleeves together.

21. The combination in a relieving machine, of a rotatable spindle adapted to rotate a blank at a fixed uniform speed, a cutting tool, mechanism for effecting relative feeding movement between the tool and the blank longitudinally of the latter, mechanism for effecting relieving movements of the tool in timed relation to the blank rotation, and mechanism for varying the timed relation between the rotative movement of the blank and the relieving movements of the tool, the said mechanism comprising a shaft, two relatively rotatable sleeves mounted on the shaft, a rack carried by the shaft, gearing meshing with the rack and including a worm on one sleeve and a worm wheel on the other, means for effecting relative movement between the rack and the gearing to turn one sleeve relatively to the other and means for clamping the two sleeves together.

22. The combination in a relieving machine, of a rotatable spindle adapted to rotate a blank at a fixed uniform speed, a cutting tool, mechanism for effecting relative feeding movement between the tool and the blank longitudinally of the latter, mechanism for effecting relieving movements of the tool in timed relation to the blank rotation, and mechanism including a rack and a pinion relatively movable in proportion to the longitudinal movement between the tool and blank for varying the relieving movements of the tool.

23. The combination in a relieving machine, of a rotatable spindle adapted to rotate a blank at a fixed uniform speed, a cutting tool, mechanism for effecting relative feeding movement between the tool and the blank longitudinally of the latter, mechanism for effecting relieving movements of the tool in timed relation to the blank rotation, and bodily rotatable gearing for varying the relieving movements of the tool.

24. The combination in a relieving machine, of a rotatable spindle adapted to rotate a blank at a fixed uniform speed, a cutting tool, mechanism for effecting relative feeding movement between the tool and the blank longitudinally of the latter, mechanism for effecting relieving movements of the tool in timed relation to the blank rotation, and longitudinally movable gearing operable in proportion to the said longitudinal movement between the tool and the blank for varying the relieving movements of the tool.

25. The combination in a relieving machine, of a rotatable blank-carrying spindle, a cutting tool, mechanism for effecting relative movement between the tool and the blank longitudinally of the latter, mechanism for effecting relieving movements of the tool in timed relation to the blank rotation, and mechanism including a rack and a pinion bodily rotatable in unison and relatively movable longitudinally in proportion to the said longitudinal movement between the tool and blank for varying the relation between the relieving movements of the tool and the rotative movement of the blank.

26. The combination in a relieving machine, of a rotatable blank-carrying spindle, a cutting tool, mechanism for effecting relative movement between the tool and the blank longitudinally of the latter, mechanism for effecting relieving movements of the tool in timed relation to the blank rotation, and bodily rotatable gearing longitudinally movable in proportion to the said longitudinal movement between the tool and blank for varying the relation between the relieving movements of the tool and the rotative movement of the blank.

27. The combination in a relieving machine, of a rotatable blank-carrying spindle, a cutting tool, mechanism for effecting relative movement between the tool and the blank longitudinally of the latter, mechanism for effecting relieving movements of the tool in timed relation to the blank rotation, and mechanism including a rack and a pinion and other gearing longitudinally movable with respect to the rack in proportion to the said longitudinal movement between the tool and blank for varying the relation between the relieving movements of the tool and the rotative movement of the blank.

28. The combination in a relieving machine, of a rotatable blank-carrying spindle, a cutting tool, mechanism for effecting relative movement between the tool and the blank longitudinally of the latter, mechanism for effecting relieving movements of the tool in timed relation to the blank rotation, and mechanism including a rack and a pinion and other gearing longitudinally moveable with respect to the rack in proportion to the said longitudinal movement between the tool and blank for varying the relation between the relieving movements of the tool and the rotative movement of the blank, the said rack and gearing being bodily rotatable.

29. The combination in a relieving machine, of a rotatable blank-carrying spindle, a cutting tool, mechanism for effecting relative movement between the tool and the blank longitudinally of the latter, mechanism including a shaft having a straight spline for effecting relieving movements of the tool in timed relation to the blank rotation, and mechanism supplemental to and carried by the shaft for varying the relation between the relieving movements of the tool and the rotative movement of the blank in proportion to the said longitudinal movement.

30. The combination in a relieving machine, of a rotatable blank-carrying spindle, a cutting tool, mechanism for moving the tool longitudinally of the blank, mechanism including a shaft having a straight spline for effecting relieving movements of the tool in timed relation to the blank rotation, and mechanism supplemental to and carried by the shaft and dependent upon the said longitudinal movement for varying the relation between the relieving movements of the tool and the rotative movement of the blank.

31. The combination in a relieving machine, of a rotatable blank-carrying spindle, a rotary milling cutter, mechanism for effecting relative movement between the cutter and the blank longitudinally of the latter, mechanism including a shaft having a straight spline for effecting relieving movements of the cutter in timed relation to the blank rotation, and mechanism supplemental to and carried by the shaft for varying the relation between the relieving movements of the cutter and the rotative movement of the blank in proportion to the said longitudinal movement.

32. The combination in a relieving machine, of a rotatable blank-carrying spindle, a cutting tool, mechanism for effecting relative movement between the tool and the blank longitudinally of the latter, mechanism including a shaft having a straight spline for effecting relieving movements of the tool in timed relation to the blank rotation, and mechanism supplemental to and carried by the shaft and dependent upon the said longitudinal movement for varying the relation between the relieving movements of the tool and the rotative movement of the blank to conform to helical teeth on the blank.

33. The combination in a relieving machine, of a rotatable blank-carrying spindle, a cutting tool, mechanism for effecting relative movement between the tool and the blank longitudinally of the latter, mechanism including a shaft having a straight spline for effecting relieving movements of the tool in timed relation to the blank rotation, and mechanism supplemental to and carried by the shaft for varying the relation between the relieving movements of the tool and the rotative movement of the blank in proportion to the said longitudinal movement and at any one of a plurality of rates.

34. The combination in a relieving machine, of a rotatable blank-carrying spindle, a cutting tool, mechanism for effecting relative movement between the tool and the blank longitudinally of the latter, mechanism including a splined shaft for effecting relieving movements of the tool in timed relation to the blank rotation, mechanism supplemental to the shaft and operated thereby for varying the relation between the relieving movements of the tool and the rotative movement of the blank in proportion to the said longitudinal movement, and means supplemental to the shaft whereby the rate at which the aforesaid relation is varied may be changed.

35. The combination in a relieving machine, of a rotatable blank-carrying spindle, a cutting tool, mechanism for effecting relative movement between the tool and the blank longitudinally of the latter, mechanism including a splined shaft for effecting relieving movements of the tool in timed relation to the blank rotation, and mechanism supplemental to and carried by the shaft for either advancing or retarding the relieving movements of the tool with respect to the rotative movement of the blank in proportion to the said longitudinal movement to conform to either right-hand or left-hand helical teeth on the blank.

36. The combination in a relieving machine, of a rotatable blank-carrying spindle, a cutting tool, mechanism for effecting relative movement between the tool and the blank longitudinally of the latter, mechanism including a splined shaft for effecting relieving movements of the tool in timed relation to the blank rotation, and mechanism supplemental to the shaft and operated thereby for either advancing or retarding the relieving movements of the tool with respect to the rotative movement of the blank in proportion to the said longitudinal movement to conform to either right-hand or left-hand helical teeth on the blank.

37. The combination in a relieving machine, of a rotatable blank-carrying spindle, a cutting tool, mechanism for effecting relative movement between the tool and the blank longitudinally of the latter, mechanism including a splined shaft for effecting relieving movements of the tool in timed relation to the blank rotation, mechanism supplemental to and carried by the shaft for either advancing or retarding the relieving movements of the tool with respect to the rotative movement of the blank in proportion to the said longitudinal movement to conform to either right-hand or left-hand helical teeth on the blank, and means whereby the rate at which the relieving movements are advanced or retarded may be changed to conform to teeth with different degrees of inclination.

38. The combination in a relieving machine, of a rotatable blank-carrying spindle, a cutting tool, mechanism for effecting relative movement between the tool and the blank longitudinally of the latter, mechanism including a rotatable shaft and a cam driven thereby for effecting relieving movements of the tool in timed relation to the spindle rotation, the normal speed relation between the shaft and cam being fixed when there is no longitudinal movement, and means supplemental to the shaft and carried thereby for turning the cam relatively to the shaft in proportion to the longitudinal movement of the tool.

39. The combination in a relieving machine, of a rotatable blank-carrying spindle, a cutting tool, mechanism for moving the tool longitudinally of the blank, mechanism including a rotatable shaft and a cam driven thereby for effecting relieving movements of the tool in timed relation to the spindle rotation, the normal speed relation between the shaft and cam being fixed when there is no longitudinal movement, and means carried by the shaft for turning the cam relatively to the shaft in proportion to the longitudinal movement of the tool and at any one of a plurality of rates while maintaining the aforesaid normal speed relation.

40. The combination in a relieving machine, of a rotatable blank-carrying spindle, a cutting tool, mechanism for moving the tool longitudinally of the blank, mechanism including a rotatable shaft and a cam driven thereby for effecting relieving movements of the tool in timed relation to the spindle rotation, the normal speed relation between the shaft and cam being fixed when there is no longitudinal movement, and means carried by the shaft for turning the cam relatively to the shaft in proportion to the longitudinal movement of the tool and in either direction while maintaining the aforesaid normal speed relation.

41. The combination in a relieving machine, of a rotatable blank-carrying spindle, a cutting tool, mechanism for moving the tool longitudinally of the blank, mechanism including a rotatable shaft and a cam thereon for effecting relieving movements of the tool in timed relation to the spindle rotation, and means supplemental to the shaft and carried thereby for turning the cam relatively to the shaft in proportion to the longitudinal movement of the tool.

42. The combination in a relieving machine of a rotatable blank-carrying spindle, a cutting tool, mechanism for moving the tool longitudinally of the blank, mechanism including a rotatable shaft and a cam thereon for effecting relieving movements of the tool in timed relation to the spindle rotation, and means carried by the shaft for turning the cam relatively to the shaft in proportion to the longitudinal movement of the tool and at any one of a plurality of rates.

43. The combination in a relieving machine, of a rotatable blank-carrying spindle, a cutting tool, mechanism for moving the tool longitudinally of the blank, mechanism including a rotatable shaft and a cam thereon for effecting relieving movements of the tool in timed relation to the spindle rotation, and means carried by the shaft for turning the cam relatively to the shaft in proportion to the longitudinal movement of the tool and in either direction.

44. The combination in a relieving machine, of a rotatable blank-carrying spindle, a cutting tool, mechanism for moving the tool longitudinally of the blank, mechanism including a rotatable shaft and a cam driven thereby for effecting relieving movements of the tool in timed relation to the spindle rotation, and mechanism including a rack and pinion carried by the shaft for turning the cam relatively to the shaft in proportion to the longitudinal movement of the tool.

45. The combination in a relieving machine, of a rotatable blank-carrying spindle, a cutting tool, mechanism for moving the tool longitudinally of the blank, mechanism including a rotatable shaft and a cam driven thereby for effecting relieving movements of the tool in timed relation to the spindle rotation, and mechanism including a rack and pinion carried by the shaft for turning the cam relatively to the shaft in proportion to the longitudinal movement of the tool and at any one of a plurality of rates.

46. The combination in a relieving machine, of a rotatable blank-carrying spindle, a cutting tool, mechanism for moving the tool longitudinally of the blank, mechanism including a rotatable shaft and a cam driven thereby for effecting relieving movements of the tool in timed relation to the spindle rotation, and mechanism including a rack and pinion carried by the shaft for turning the cam relatively to the shaft in proportion to the longitudinal movement of the tool and in either direction.

47. The combination in a relieving machine, of a rotatable blank-carrying spindle, a cutting tool, mechanism for moving the tool longitudinally of the blank, mechanism including a rotatable shaft and a cam driven thereby for effecting relieving movements of the tool in timed relation to the spindle rotation, and bodily rotatable gearing carried by the shaft for turning the cam relatively to the shaft in proportion to the longitudinal movement of the tool.

48. The combination in a relieving machine, of a rotatable blank-carrying spindle, a cutting tool, mechanism for moving the tool longitudinally of the blank, mechanism including a rotatable shaft and a cam driven thereby for effecting relieving movements of the tool in timed relation to the spindle rotation, and bodily rotatable gearing carried by the shaft for turning the cam relatively to the shaft in proportion to the longitudinal movement of the tool and at any one of a plurality of rates.

49. The combination in a relieving machine, of a rotatable blank-carrying spindle, a cutting tool, mechanism for moving the tool longitudinally of the blank, mechanism including a rotatable shaft and a cam driven thereby for effecting relieving movements of the tool in timed relation to the spindle rotation, and bodily rotatable gearing carried by the shaft for turning the cam relatively to the shaft in proportion to the longitudinal movement of the tool and in either direction.

50. The combination in a relieving machine, of a rotatable blank-carrying spindle, a cutting tool, mechanism for moving the tool longitudinally of the blank, mechanism including a rotatable shaft and a cam driven thereby for effecting relieving movements of the tool in timed relation to the spindle rotation, and longitudinally movable gearing carried by the shaft and operable in proportion to the longitudinal movement of the tool for turning the cam relatively to the shaft in proportion to the said longitudinal movement.

51. The combination in a relieving machine, of a rotatable blank-carrying spindle, a cutting tool, mechanism for moving the tool longitudinally of the blank, mechanism including a rotatable shaft and a cam driven thereby for effecting relieving movements of the tool in timed relation to the spindle rotation, and longitudinally movable gearing carried by the shaft and operable in proportion to the longitudinal movement of the tool for turning the cam relatively to the shaft in proportion to the said longitudinal movement and at any one of a plurality of rates.

52. The combination in a relieving machine, of a rotatable blank-carrying spindle, a cutting tool, mechanism for moving the tool longitudinally of the blank, mechanism including a rotatable shaft and a cam driven thereby for effecting relieving movements of the tool in timed relation to the spindle rotation, and longitudinally movable gearing carried by the shaft and operable in proportion to the longitudinal movement of the tool for turning the cam relatively to the shaft in proportion to the said longitudinal movement and in either direction.

53. The combination in a relieving machine, of a rotatable blank-carrying spindle, a cutting tool, mechanism for moving the tool longitudinally of the blank, mechanism including a rotatable shaft and a cam driven thereby for effecting relieving movements of the tool in timed relation to the spindle rotation, and bodily rotatable gearing carried by the shaft for turning the cam relatively to the shaft in proportion to the longitudinal movement of the tool.

54. The combination in a relieving machine, of a rotatable blank-carrying spindle, a cutting tool, mechanism for moving the tool longitudinally of the blank, mechanism including a rotatable shaft and a cam driven thereby for effecting relieving movements of the tool in timed relation to the spindle rotation, and mechanism including a bodily rotatable rack and pinion carried by the shaft for turning the cam relatively to the shaft in proportion to the longitudinal movement of the tool.

55. The combination in a relieving machine, of a rotatable blank-carrying spindle, a cutting tool, mechanism for moving the tool longitudinally of the blank, mechanism including a rotatable shaft and a cam driven thereby for effecting relieving movements of the tool in timed relation to the spindle rotation, and bodily rotatable and longitudinally movable gearing carried by the shaft for turning the cam relatively to the shaft in proportion to the longitudinal movement of the tool.

56. The combination in a relieving machine, of a rotatable blank-carrying spindle, a cutting tool, mechanism including a longitudinal rotatable shaft and a cam thereon for effecting relieving movements of the tool in timed relation to the spindle rotation, mechanism for moving the tool and the cam longitudinally of the blank, a longitudinal rack on the shaft, and gearing connecting the rack and cam, the gearing being bodily rotatable with the shaft and longitudinally movable with the tool whereby the cam is turned on the shaft in proportion to its movement therealong.

57. The combination in a relieving machine, of a rotatable blank-carrying spindle, a cutting tool, mechanism for effecting relative movement between the tool and the blank longitudinally of the latter, mechanism for effecting relieving movements of the tool in timed relation to the blank rotation, disengageable mechanism including a rack and a pinion relatively movable in proportion to the said longitudinal movement between the tool and blank for varying the relation between the relieving movements of the tool and the rotative movement of the blank, and means for preventing variation in the aforesaid timed relation when the said mechanism is disengaged.

58. The combination in a relieving machine, of a rotatable blank-carrying spindle, a cutting tool, mechanism for effecting relative movement between the tool and the blank longitudinally of the latter, mechanism for effecting relieving movements of the tool in timed relation to the blank rotation, bodily rotatable disengageable gearing for varying the relation between the relieving movements of the tool and the rotative movement of the blank, and means for preventing variation in the aforesaid timed relation when the said mechanism is disengaged.

59. The combination in a relieving machine, of a rotatable blank-carrying spindle, a cutting tool, mechanism for effecting relative movement between the tool and the blank longitudinally of the latter, mechanism for effecting relieving movements of the tool in timed relation to the blank rotation, disengageable gearing longitudinally movable in proportion to the said longitudinal movement between the tool and blank for varying the relation between the relieving movements of the tool and the rotative movement of the blank, and means for preventing variation in the aforesaid timed relation when the said mechanism is disengaged.

60. The combination in a relieving machine, of a rotatable blank-carrying spindle, a cutting tool, mechanism for effecting relative movement between the tool and the blank longitudinally of the latter, mechanism including a splined shaft for effecting relieving movements of the tool in timed relation to the blank rotation, disengageable mechanism supplemental to the shaft for varying the relation between the relieving movements of the tool and the rotative movement of the blank in proportion to the said longitudinal movement, and means for preventing variation in the aforesaid timed relation when the said mechanism is disengaged.

61. The combination in a relieving machine, of a rotatable blank-carrying spindle, a cutting tool, mechanism for moving the tool longitudinally of the blank, mechanism including a rotatable shaft and a cam driven thereby for effecting relieving movements of the tool in timed relation to the spindle rotation, the normal speed relation between the shaft and cam being fixed when there is no longitudinal movement, disengageable mechanism for turning the cam relatively to the shaft in proportion to the longitudinal movement of the tool, and means for preventing variation in the aforesaid timed relation when the said mechanism is disengaged.

62. The combination in a relieving machine, of a rotatable blank-carrying spindle, a cutting tool, mechanism for moving the tool longitudinally of the blank, mechanism including a rotatable shaft and a cam driven thereby for effecting relieving movements of the tool in timed relation to the spindle rotation, disengageable mechanism including a rack and pinion carried by the shaft for turning the cam relatively to the shaft in proportion to the longitudinal movement of the tool, and means for preventing variation in the aforesaid timed relation when the said mechanism is disengaged.

63. The combination in a relieving machine, of a rotatable blank-carrying spindle, a cutting tool, mechanism for moving the tool longitudinally of the blank, mechanism including a rotatable shaft and a cam driven thereby for effecting relieving movements to the tool in timed relation to the spindle rotation, bodily rotatable disengageable gearing carried by the shaft for turning the cam relatively to the shaft in proportion to the longitudinal movement of the tool, and means for preventing variation in the aforesaid timed relation when the said mechanism is disengaged.

64. The combination in a relieving machine, of a rotatable blank-carrying spindle, a cutting tool, mechanism for moving the tool longitudinally of the blank, mechanism including a rotatable shaft and a cam driven thereby for effecting relieving movements of the tool in timed relation to the spindle rotation, longitudinally movable disengageable gearing carried by the shaft for turning the cam relatively to the shaft in proportion to the longitudinal movement of the tool, and means for preventing variation in the aforesaid timed relation when the said mechanism is disengaged.

65. The combination in a relieving machine, of a rotatable blank-carrying spindle, a cutting tool, mechanism including a rotatable shaft and a cam thereon for effecting relieving movements of the tool in timed relation to the spindle rotation, mechanism for moving the tool and the cam longitudinally of the blank, a longitudinal rack on the shaft, disengageable gearing connecting the rack and cam, the gearing being bodily rotatable with the shaft and longitudinally movable with the tool whereby the cam is turned on the shaft in proportion to its movement therealong, and means for locking the cam against rotation independently of the shaft when the gearing is disengaged.

66. The combination of a rotatable blank-carrying spindle, a cutting tool, and automatic means for effecting at intervals relative intermittent feeding movements in the same direction between the tool and the blank longitudinally of the latter, and for insuring each feeding movement taking place after each rotation of the spindle to a predetermined extent approximating one revolution.

67. The combination of a rotatable blank-carrying spindle, a cutting tool, automatic means for effecting regular step-by-step longitudinal feeding movements of the tool, and automatic means supplemental to the feeding means for locking the tool after each feeding movement.

68. The combination of a rotatable blank-carrying spindle, a cutting tool, automatic means for effecting regular step-by-step longitudinal feeding movements of the tool, and automatic means supplemental to the feeding means for locking the tool after each feeding movement and unlocking it before the next feeding movement.

69. The combination of a rotatable blank-carrying spindle, a cutting tool, automatic means supplemental to the feeding means for locking the tool after each feeding movement, automatic means for effecting regular step-by-step longitudinal feeding movements of the tool, and means for changing the amount of feed at each step.

70. The combination of a rotatable blank-carrying spindle, a cutting tool, a screw for moving the tool longitudinally of the blank, an intermittently operated controlling shaft, and means controlled by the said controlling shaft to turn the screw at each movement of the shaft.

71. The combination of a rotatable blank-carrying spindle, a cutting tool, a screw for moving the tool longitudinally of the blank, an intermittently operated controlling shaft, means controlled by the said controlling shaft to turn the screw at each movement of the shaft, and means independent of the controlling shaft for changing the angle of turning of the screw.

72. The combination of a rotatable blank-carrying spindle, a cutting tool, a screw for moving the tool longitudinally of the blank, a shaft for the screw, means for repeatedly turning the shaft through a fixed angle, and change-speed gearing between the shaft and the screw.

73. The combination of a rotatable blank-carrying spindle, a tool carriage movable longitudinally at intervals, a cutting tool on the carriage, and mechanism for effecting the aforesaid movement of the carriage at intervals, the mechanism comprising a shaft connected to the carriage and normally locked against rotation, a device for applying rotative force to the shaft and means for releasing the shaft and for then stopping it independently of the force applying device after rotation to a predetermined extent.

74. The combination of a rotatable blank-carrying spindle, a tool carriage movable longitudinally at intervals, a cutting tool on the carriage, mechanism for effecting the aforesaid movement of the carriage at intervals, the mechanism comprising a shaft connected to the carriage and normally locked against rotation, a device for applying rotative force to the shaft and means for releasing the shaft and for then stopping it independently of the force applying device after rotation to a predetermined extent, and change-speed gearing interposed between the shaft and the carriage whereby the extent of movement of the latter may be changed.

75. The combination of a rotatable blank-carrying spindle, a tool carriage movable longitudinally at intervals, a cutting tool on the carriage, and mechanism for effecting the aforesaid movement of the carriage at intervals, the mechanism comprising an intermittently operated shaft, another shaft connected to the carriage and normally locked against rotation, a frictional connection between the two shafts, means operated by the first shaft for releasing the second shaft and means for then stopping the second shaft independently of the first shaft after rotation to a predetermined extent.

76. The combination in a relieving machine, of a rotatable blank-carrying spindle, a tool carriage, a cutting tool on the carriage, a screw for moving the carriage and tool longitudinally of the blank, automatic means for turning the screw intermittently in one direction, and means supplemental to the screw but controlled thereby for independently adjusting the carriage and tool longitudinally.

77. The combination in a relieving machine, of a rotatable blank-carrying spindle, a tool carriage, a cutting tool on the carriage, a screw for moving the carriage and tool longitudinally of the blank, automatic means for turning the screw intermittently in one direction, and a screw supplemental to the aforesaid screw for independently adjusting the carriage and tool longitudinally.

78. The combination of a rotatable blank-carrying spindle, a tool carriage, a cutting tool on the carriage, and means for longitudinally moving the carriage and the tool either continuously or intermittently.

79. The combination of a rotatable blank-carrying spindle, a tool carriage, a cutting tool on the carriage, and two optionally operable mechanisms, one for longitudinally moving the carriage and the tool continuously and the other for moving them intermittently.

80. The combination of a rotatable blank-carrying spindle, a tool carriage, a cutting tool on the carriage, an intermittently operated shaft, a device for longitudinally moving the carriage and the tool, and means for connecting the said device with the shaft for intermittent operation or with the spindle for continuous operation.

81. The combination of a rotatable blank-carrying spindle, a tool carriage, a cutting tool on the carriage, an intermittently operated shaft, a device for longitudinally moving the carriage and the tool, and driving mechanism for the said device comprising a bodily movable gear connectible with the shaft for intermittent operation or with the spindle for continuous operation.

82. The combination of a work holder, a cutting tool, means for effecting relative movement between the work and the tool to cause cutting to take place, automatic means for effecting regular step-by-step longitudinal feeding movement of the tool, and automatic means supplemental to the feeding means for locking the tool after each feeding movement.

83. The combination of a work holder, a cutting tool, means for effecting relative movement between the work and the tool to cause cutting to take place, automatic means for effecting regular step-by-step longitudinal feeding movements of the tool, and automatic means supplemental to the feeding means for locking the tool after each feeding movement and unlocking it before the next feeding movement.

84. The combination of a work carrier, a cutting tool, means comprising a screw for effecting relative movement between the tool and the work carrier, an intermittently-operated controlling shaft, and means governed by the said controlling shaft for turning the screw at each movement of the shaft.

85. The combination of a work-carrying member, a tool carriage, a cutting tool on the carriage, and two optionally operable mechanisms, one for effecting continuous longitudinal feeding movement between the carriage and said work member and the other mechanism for effecting intermittent feeding movements between the work member and the carriage.

86. A metal cutting machine comprising in combination, a rotatable blank-carrying spindle, a cutting tool, automatic means for intermittently feeding the tool longitudinally at intervals in the same direction, and mechanism for effecting relieving movements of the tool in timed relation to the spindle rotation.

87. A metal cutting machine comprising in combination, a rotatable blank-carrying spindle, a cutting tool, and automatic means for intermittently feeding the tool longitudinally at intervals in the same direction, each longitudinal movement taking place after rotation of the spindle to an extent approximately equal to one revolution but differing somewhat therefrom.

88. A metal cutting machine comprising, in combination, a rotatable blank-carrying spindle, a cutting tool, automatic means for intermittently feeding the tool longitudinally at intervals in the same direction, and mechanism for effecting relieving movements of the tool in timed relation to the spindle rotation, the timing of the feeding movements being independent of the timing of the relieving movements.

89. A metal cutting machine comprising in combination, a rotatable blank-carrying spindle, a cutting tool, automatic means for intermittently feeding the tool longitudinally at intervals in the same direction, mechanism for effecting relieving movements of the tool in timed relation to the spindle rotation, and means for varying the said timed relation in proportion to the said feeding movements.

90. A metal cutting machine comprising in combination, a rotatable blank-carrying spindle, a cutting tool automatic means for intermittently feeding the tool longitudinally at intervals in the same direction, mechanism for effecting relieving movements of the tool in timed relation to the spindle rotation, and means for either advancing or retarding the relieving movements of the tool with respect to the rotative movement of the blank in proportion to the said feeding movements.

91. A metal cutting machine comprising in combination, a rotatable blank-carrying spindle, a tool carriage, a cutting tool on the carriage, means for longitudinally moving the carriage and the tool either continuously or intermittently, and automatically acting mechanism for effecting regular relieving movements of the tool in timed relation to the spindle rotation, the said mechanism being operative with the tool movement either continuous or intermittent.

92. A metal cutting machine comprising in combination, a rotatable blank-carrying spindle, a tool carriage, a cutting tool on the carriage, means for longitudinally moving the carriage and the tool either continuously or intermittently, automatically acting mechanism for effecting regular relieving movements of the tool in timed relation to the spindle rotation, the said mechanism being operative with the tool movement either continuous or intermittent, and means for changing the timed relation between the relieving movements and the spindle rotation in accordance with the feed.

93. The combination as described, of a rotatable blank-carrying spindle, a cutting tool, means for feeding the tool longitudinally of the blank, and automatic means for repeatedly stopping the spindle and for repeatedly starting it always in the same direction.

94. The combination as described, of a rotatable blank-carrying spindle, a cutting tool, means for feeding the tool longitudinally of the blank, and automatic means for repeatedly stopping the spindle after each rotation thereof to a predetermined extent and for repeatedly starting it always in the same direction.

95. The combination as described, of a rotatable blank-carrying spindle, a cutting tool, means for feeding the tool longitudinally of the blank, and automatic means for repeatedly stopping the spindle after each rotation thereof to a predetermined extent approximating one revolution but differing slightly therefrom and for repeatedly starting it always in the same direction.

96. The combination as described, of a rotatable blank-carrying spindle, a cutting tool, means for feeding the tool with respect to the blank, and automatic means for stopping the spindle after rotation thereof through a little more than one revolution.

97. The combination as described, of a rotatable blank-carrying spindle, a cutting tool, means for feeding the tool with respect to the blank, and automatic means for repeatedly stopping the spindle after each rotation thereof to a predetermined extent a little more than one revolution and for repeatedly starting it always in the same direction.

98. The combination as described, of a rotatable blank-carrying spindle, a cutting tool, means for feeding the tool with respect to the blank, a controlling member connected to the spindle so as to rotate slightly slower than the spindle, and means operable after one revolution of the controlling member and after a little more than one revolution of the spindle for stopping the spindle.

99. The combination as described, of a rotatable blank-carrying spindle, means including a clutch for rotating the spindle, a cutting tool, means for feeding the tool with respect to the blank, a controlling member connected to the spindle so as to rotate slightly slower than the spindle, and means operable after one revolution of the controlling member and after a little more than one revolution of the spindle for opening the said clutch.

100. The combination as described, of a rotatable blank-carrying spindle, a cutting tool, means for feeding the tool with respect to the blank, a controlling member connected to the spindle so as to rotate slightly slower than the spindle, means operable after one revolution of the controlling member and after a little more than one revolution of the spindle for stopping the spindle, and automatic means for starting the spindle after each stopping thereof.

101. The combination as described, of a work-carrying member, a cutting member, means for effecting feeding movement between said members, and automatic means for repeatedly stopping one of said members and for repeatedly starting it always in the same direction.

102. A machine of the class described, comprising in combination, a rotatable blank-carrying spindle, a cutting tool, means for feeding the tool longitudinally of the blank, automatic means for repeatedly stopping the spindle and for repeatedly starting it always in the same direction, and automatically acting mechanism for effecting regular relieving movements of the tool.

103. A machine of the class described, comprising in combination, a rotatable blank-carrying spindle, a cutting tool, means for feeding the tool longitudinally of the blank, automatic means for repeatedly stopping the spindle after each rotation thereof to a predetermined extent and for repeatedly starting it always in the same direction, and automatically acting mechanism for effecting regular relieving movements of the tool.

104. A machine of the class described, comprising in combination, a rotatable blank-carrying spindle, a cutting tool, means for feeding the tool longitudinally of the blank, automatic means for repeatedly stopping the spindle after each rotation thereof to a predetermined extent a little more than one revolution and for repeatedly starting it always in the same direction, and automatically acting mechanism for effecting regular relieving movements of the tool.

105. A machine of the class described, comprising in combination, a rotatable blank-carrying spindle, a cutting tool, means for feeding the tool longitudinally of the blank, automatic means for repeatedly stopping the spindle after each rotation thereof to a predetermined extent and for repeatedly starting it always in the same direction, and automatically acting mechanism for effecting regular relieving movements of the tool, the timing of the stopping of the spindle being independent of the timing of the relieving movements.

106. A machine of the class described, comprising in combination, a rotatable blank-carrying spindle, a cutting tool, means for feeding the tool longitudinally of the blank, automatic means for repeatedly stopping the spindle after each rotation thereof to a predetermined extent and for repeatedly starting it always in the same direction, automatically acting mechanism for effecting regular relieving movements of the tool in timed relation to the spindle rotation, and means for changing the said timed relation in accordance with the feed.

107. A machine of the class described, comprising in combination, a rotatable blank-carrying spindle, a cutting tool, means for feeding the tool longitudinally of the blank, automatic means for repeatedly stopping the spindle after each rotation thereof to a predetermined extent and for repeatedly starting it always in the same direction, automatically acting mechanism for effecting regular relieving movements of the tool in timed relation to the spindle rotation, and means for changing the said timed relation in accordance with the feed at any one of a plurality of rates.

108. The combination of a rotatable blank-carrying spindle, a cutting tool, automatic means for intermittently feeding the tool longitudinally at intervals in the same direction, and automatic means for stopping the spindle rotation during each longitudinal movement of the tool.

109. The combination of a rotatable blank-carrying spindle, a cutting tool, automatic means for intermittently feeding the tool longitudinally at intervals in the same direction, each longitudinal movement taking place after rotation of the spindle to a predetermined extent, and automatic means for stopping the spindle rotation during each longitudinal movement of the tool.

110. The combination of a rotatable blank-carrying spindle, a cutting tool, automatic means for intermittently feeding the tool longitudinally at intervals in the same direction, each longitudinal movement taking place after rotation of the spindle to a predetermined extent approximating one revolution but differing slightly therefrom, and automatic means for stopping the spindle rotation during each longitudinal movement of the tool.

111. The combination of a rotatable blank-carrying spindle, a cutting tool, automatic means for intermittently feeding the tool longitudinally at intervals in the same direction, each longitudinal movement taking place after rotation of the spindle to a predetermined extent a little more than one revolution, and automatic means for stopping the spindle rotation during each longitudinal movement of the tool.

112. A metal cutting machine comprising in combination, a rotatable blank-carrying spindle, a tool carriage, a cutting tool on the carriage, means for longitudinally moving the carriage and the tool either continuously or intermittently, and automatic means for stopping the spindle rotation during each longitudinal movement of the tool when the movement is intermittent.

113. The combination of a rotatable work-carrying member, a cutting tool, automatic means for effecting feeding movements between the tool and said work-carrying member at intervals in the same direction, and automatic means for stopping the rotation of the work-carrying member during each feeding movement.

114. The hereindescribed combination of a rotatable blank-carrying spindle, a cutting tool, automatic means for effecting regular intermittent longitudinal feeding movements of the tool with respect to the blank all in the same direction, automatically acting mechanism for effecting regular relieving movements of the tool supplemental to the aforesaid feeding movements, and automatic means for stopping the spindle rotation and relieving movements at the time of each feeding movement.

115. The hereindescribed combination of a rotatable blank-carrying spindle, a cutting tool, automatic means for effecting regular intermittent longitudinal feeding movements of the tool with respect to the blank all in the same direction, each feeding movement taking place after rotation of the blank to a predetermined extent, automatically acting mechanism for effecting regular relieving movements of the tool supplemental to the aforesaid feeding movements, and automatic means for stopping the spindle rotation and relieving movements at the time of each feeding movement.

116. The hereindescribed combination of a rotatable blank-carrying spindle, a cutting tool, automatic means for effecting regular intermittent longitudinal feeding movements of the tool with respect to the blank all in the same direction, each feeding movement taking place after rotation of the blank to a predetermined extent a little more than one revolution, automatically acting mechanism for effecting regular relieving movements of the tool supplemental to the aforesaid feeding movements, and automatic means for stopping the spindle rotation and relieving movements at the time of each feeding movement.

117. The hereindescribed combination of a rotatable blank-carrying spindle, a cutting tool, automatic means for effecting regular intermittent longitudinal feeding movements of the tool with respect to the blank all in the same direction, each feeding movement taking place after rotation of the blank to a predetermined extent, automatically acting mechanism for effecting regular relieving movements of the tool supplemental to the aforesaid feeding movements, the timing of the relieving movements being independent of the timing of the feeding movements, and automatic means for stopping the spindle rotation and relieving movements at the time of each feeding movement.

118. The hereindescribed combination of a rotatable blank-carrying spindle, a cutting tool, automatic means for effecting regular intermittent longitudinal feeding movements of the tool with respect to the blank all in the same direction, automatically acting mechanism for effecting regular relieving movements of the tool supplemental to the aforesaid feeding movements and in timed relation to the spindle rotation, means for changing the said timed relation in accordance with the feed, and automatic means for stopping the spindle rotation and relieving movements at the time of each feeding movement.

119. The hereindescribed combination of a rotatable blank-carrying spindle, a cutting tool, automatic means for effecting regular intermittent longitudinal feeding movements of the tool with respect to the blank all in the same direction at any one of a plurality of rates, automatically acting mechanism for effecting regular relieving movements of the tool supplemental to the aforesaid feeding movements, the timing of the relieving movements being independent of the timing of the feeding movements, and automatic means for stopping the spindle rotation and relieving movements at the time of each feeding movement.

120. A metal cutting machine comprising in combination, a rotatable blank-carrying spindle, a tool carriage, a cutting tool on the carriage, means for longitudinally moving the carriage and the tool either continuously or intermittently, automatically acting mechanism for effecting regular relieving movements of the tool supplemental to the aforesaid feeding movements, and automatic means for stopping the spindle rotation and relieving movements at the time of each feeding movement when the movement is intermittent.

121. A metal cutting machine comprising in combination, a rotatable blank-carrying spindle, a tool carriage, a cutting tool on the carriage, means for longitudinally moving the carriage and the tool either continuously or intermittently, automatically acting mechanism for effecting regular relieving movements of the tool supplemental to the aforesaid feeding movements and in timed relation to the spindle rotation, means for changing the said timed relation in accordance with the feed, and automatic means for stopping the spindle rotation and relieving movements at the time of each feeding movement when the movement is intermittent.

122. In a relieving machine, the combination of a rotatable blank-carrying spindle, a cutting tool, means for feeding the tool longitudinally of the blank, automatically acting mechanism for effecting regular relieving movements of the tool, and automatic means supplemental to the last said means for repeatedly withdrawing the tool from the blank.

123. In a relieving machine, the combination of a rotatable blank-carrying spindle, a cutting tool, means for feeding the tool longitudinally of the blank, automatically acting mechanism for effecting regular relieving movements of the tool, and automatic means supplemental to the last said means for repeatedly withdrawing the tool from the blank after each rotation thereof to a predetermined extent.

124. In a relieving machine, the combination of a rotatable blank-carrying spindle, a cutting tool, means for feeding the tool longitudinally of the blank, automatically acting mechanism for effecting regular relieving movements of the tool, and automatic means supplemental to the last said means for repeatedly withdrawing the tool from the blank after each rotation thereof to a predetermined extent, the timing of the withdrawing movements being independent of the timing of the relieving movements.

125. In a relieving machine, the combination of a rotatable blank-carrying spindle, a cutting tool, means for feeding the tool longitudinally of the blank in timed relation to the spindle rotation, automatically acting mechanism for effecting regular relieving movements of the tool, automatic means supplemental to the last said means for repeatedly withdrawing the tool from the blank, and means for changing the timed relation of the relieving movements in accordance with the feed.

126. In a relieving machine, the combination of a rotatable blank-carrying spindle, a cutting tool, means for feeding the tool longitudinally of the blank in timed relation to the spindle rotation, automatically acting mechanism for effecting regular relieving movements of the tool, automatic means supplemental to the last said means for repeatedly withdrawing the tool from the blank, and means for changing the timed relation of the relieving movements in accordance with the feed at any one of a plurality of rates.

127. In a relieving machine, the combination of a rotatable blank-carrying spindle, a tool carriage, a transversely movable slide on the carriage, a cutting tool on the slide, relieving mechanism engaging the slide for regularly reciprocating it to effect relieving movements of the tool, and automatic means supplemental to the relieving mechanism for moving the slide in timed relation to the spindle rotation.

128. The combination of a work-holder, a cutting tool, means for effecting relative movement between the work and the tool to cause cutting to take place, automatic means for effecting at intervals relative movements in the same direction between the tool and the work longitudinally of the latter, and means for controlling the relative positions of the tool and work so that they are out of contact during the feeding movements.

129. In a metal cutting machine, the combination of a rotatable blank-carrying spindle, a cutting tool, means for moving the tool into engagement with the blank to cut it to a predetermined form, automatic means for feeding the tool longitudinally at intervals in the same direction, and means controlling the relative positions of the tool and blank so that they are out of contact during the feeding movements.

130. The combination of a work-holder, a cutting tool, means for effecting relative movement between the work and the tool to cut the work to a predetermined form, and automatic means for effecting at intervals relative movements in the same direction between the tool and the work longitudinally of the latter and for withdrawing the tool from the work at the time of each longitudinal movement.

131. The combination of a work-holder, a cutting tool, means for effecting relative movement between the work and the tool to cut the work to a predetermined form, and automatic means for moving the tool longitudinally at intervals to the same direction and for withdrawing it from the work at the time of each longitudinal movement.

132. In a metal cutting machine, the combination of a rotatable blank-carrying spindle, a cutting tool, means for moving the tool into engagement with the blank to cut it to a predetermined form, and automatic means for effecting regular step-by-step longitudinal movements of the tool and for withdrawing it from the blank at the time of each longitudinal movement.

133. In a metal cutting machine, the combination of a rotatable blank-carrying spindle, a cutting tool, means for moving the tool into engagement with the blank to cut it to a predetermined form, and automatic means for effecting a regular step-by-step longitudinal movement of the tool and for withdrawing it from the blank before each longitudinal movement and returning it to its initial position with respect to the blank axis after each longitudinal movement.

134. The combination of a work-holder, a cutting tool, means for effecting relative movement between the work and the tool to cut the work to a predetermined form, automatic means for effecting regular step-by-step longitudinal movements of the tool and for withdrawing it from the work at the time of each longitudinal movement, and means for changing the extent of the longitudinal movements.

135. The combination of a rotatable blank-carrying spindle, a cutting tool, and automatic means for moving the tool longitudinally at intervals, for withdrawing it from the blank at the time of each longitudinal movement, and for insuring each longitudinal movement taking place after rotation of the spindle to a predetermined extent.

136. The combination of a rotatable blank-carrying spindle, a rotatable milling cutter, and automatic means for moving the cutter longitudinally at intervals, for disengaging it from the blank at the time of and for insuring each longitudinal movement, each longitudinal movement taking place after the rotation of the spindle through a little more than one complete revolution.

137. The combination of a rotatable blank-carrying spindle, a cutting tool, and automatic means for moving the tool longitudinally at intervals, for withdrawing it from the blank at the time of each longitudinal movement, and for insuring each longitudinal movement taking place after rotation of the spindle to a predetermined extent approximating one revolution but slightly differing therefrom.

138. The combination of a rotatable blank-carrying spindle, a tool carriage, a cutting tool on the carriage, mechanism for moving the carriage and the tool longitudinally at intervals comprising an intermittently operated shaft, and means operated by the said shaft for disengaging the tool from the blank at the time of each longitudinal movement.

139. The combination of a rotatable blank-carrying spindle, a tool carriage, a cutting tool on the carriage, mechanism for moving the carriage and the tool longitudinally at intervals comprising an intermittently operated shaft, means operated by the said shaft for disengaging the tool from the blank at the time of each longitudinal movement, and means for preventing the movement of the carriage until the tool has been disengaged from the blank.

140. The combination of a rotatable blank-carrying spindle, a tool carriage, a cutting tool on the carriage, mechanism for moving the carriage and the tool longitudinally at intervals comprising an intermittently operated shaft, and means comprising a cam operated by the said shaft for disengaging the tool from the blank at the time of each longitudinal movement.

141. The combination of a rotatable blank-carrying spindle, a tool carriage, a cutting tool on the carriage, an intermittently operated shaft, mechanism for moving the carriage and the tool longitudinally, mechanism for disengaging the tool from the blank at the time of each longitudinal movement, and two cams operated by the shaft and acting in succession to respectively operate the tool disengaging mechanism and to start the operation of the carriage moving mechanism.

142. The combination of a rotatable blank-carrying spindle, a tool carriage, a cutting tool on the carriage, means for longitudinally moving the carriage and the tool either continuously or intermittently, and means controlling the relative positions of the tool and blank so that they are out of contact during the feeding movement when the said movement is intermittent.

143. The combination of a rotatable blank-carrying spindle, a tool carriage, a cutting tool on the carriage, means for longitudinally moving the carriage and the tool either continuously or intermittently, and means for disengaging the tool from the blank at the time of longitudinal movement when the said movement is intermittent.

144. The combination of a rotatable blank-carrying spindle, a tool carriage, a cutting tool on the carriage, two optionally operable mechanisms, one for longitudinally moving the carriage and the tool continuously and the other for moving them intermittently, and means connected with the last said mechanism for disengaging the tool from the blank at the time of longitudinal movement.

145. The combination of a rotatable work holder, a tool for cutting the work to a predetermined form, automatic means for effecting feeding movements between the tool and the holder and for withdrawing the tool from engagement with the work at the time of each feeding movement, and means for insuring the withdrawing of the tool from engagement with the work prior to each feeding movement and after a predetermined rotation of the work.

146. The combination of a rotatable work holder, a rotatable milling cutter for cutting the work to a predetermined form, automatic means for effecting intermittent feeding movements between the cutter and the work and for withdrawing the cutter from engagement with the work at the time of each feeding movement, and means for insuring the withdrawing of the cutter from engagement with the work just prior to each feeding movement and after the rotation of the work through a little more than one complete rotation.

147. The combination in a machine of the class described, of a rotatable blank carrying spindle, a cutting tool, automatic means for effecting at intervals relative movements in the same direction between the tool and the blank longitudinally of the latter, mechanism for effecting relieving movements of the tool in timed relation to the blank rotation, and means controlling the relative positions of the tool and blank so that they are out of contact during the feeding movements.

148. The combination in a machine of the class described of a rotatable blank-carrying spindle, a cutting tool, automatic means for moving the tool longitudinally at intervals and for disengaging it from the blank at the time of each longitudinal movement, and mechanism for effecting relieving movements of the tool in timed relation to the blank rotation.

149. The combination in a machine of the class described of a rotatable blank-carrying spindle, a cutting tool, automatic means for moving the tool longitudinally at intervals and for disengaging it from the blank at the time of each longitudinal movement, mechanism for effecting relieving movements of the tool in timed relation to the blank rotation, and mechanism for varying the relation between the relieving movements of the tool and the rotative movement of the blank in proportion to the said longitudinal movements.

150. The combination in a machine of the class described of a rotatable blank-carrying spindle, a cutting tool, automatic means for moving the tool longitudinally at intervals and for disengaging it from the blank at the time of each longitudinal movement, mechanism for effecting relieving movements of the tool in timed relation to the blank rotation, and mechanism for varying the relation between the relieving movements of the tool and the rotative movement of the blank in proportion to the said longitudinal movements and at any one of a plurality of rates.

151. The combination in a machine of the class described of a rotatable blank-carrying spindle, a cutting tool, automatic means for moving the tool longitudinally at intervals and for disengaging it from the blank at the time of each longitudinal movement, mechanism for effecting relieving movements of the tool in timed relation to the blank rotation, and mechanism for either advancing or retarding the relieving movements of the tool with respect to the rotative movement of the blank in proportion to the said longitudinal movement to conform to either right-hand or left-hand helical teeth on the blank.

152. The combination in a machine of the class described, of a rotatable blank-carrying spindle, a cutting tool, automatic means for longitudinally moving the tool either continuously or intermittently, mechanism for effecting relieving movements of the tool in timed relation to the blank rotation, and means controlling the relative positions of the tool and blank so that they are out of contact during the feeding movements when the feeding is intermittent.

153. The combination in a metal cutting machine, of a rotatable blank-carrying spindle, a cutting tool, means for feeding the tool longitudinally of the blank, automatic means for repeatedly stopping the spindle and for repeatedly starting it always in the same direction, and automatic means for withdrawing the tool from the blank at each stopping of the spindle.

154. The combination in a metal cutting machine, of a rotatable blank-carrying spindle, a cutting tool, means for feeding the tool longitudinally of the blank, automatic means for repeatedly stopping the spindle after each rotation thereof to a predetermined extent and for repeatedly starting it always in the same direction, and automatic means for withdrawing the tool from the blank at each stopping of the spindle.

155. The combination in a metal cutting machine, of a rotatable blank-carrying spindle, a cutting tool, means for feeding the tool longitudinally of the blank, automatic means for repeatedly stopping the spindle after each rotation thereof to a predetermined extent approximating one revolution but differing slightly therefrom and for repeatedly starting it always in the same direction, and automatic means for withdrawing the tool from the blank at each stopping of the spindle.

156. The combination in a metal cutting machine, of a rotatable blank-carrying spindle, a cutting tool, means for feeding the tool with respect to the blank, automatic means for stopping the spindle after rotation thereof through a little more than one revolution, and automatic means acting in timed relation with the stopping means for withdrawing the tool from the blank.

157. The combination in a metal cutting machine, of a rotatable blank-carrying spindle, a cutting tool, means for feeding the tool with respect to the blank, automatic means for stopping the spindle after rotation thereof through a little more than one revolution, automatic means acting in timed relation with the stopping means for withdrawing the tool from the blank, and means for repeatedly starting the spindle always in the same direction.

158. The described combination of a rotatable blank-carrying spindle, a cutting tool, means for feeding the tool longitudinally of the blank, automatic means for repeatedly stopping the spindle and for repeatedly starting it always in the same direction, automatic means for withdrawing the tool from the blank at each stopping of the spindle, and automatically acting mechanism for effecting regular relieving movements of the tool.

159. The described combination of a rotatable blank-carrying spindle, a cutting tool, means for feeding the tool longitudinally of the blank, automatic means for repeatedly stopping the spindle after each rotation thereof to a predetermined extent and for repeatedly starting it always in the same direction, automatic means for withdrawing the tool from the blank at each stopping of the spindle, and automatically acting mechanism for effecting regular relieving movements of the tool.

160. The described combination of a rotatable blank-carrying spindle, a cutting tool, means for feeding the tool longitudinally of the blank, automatic means for repeatedly stopping the spindle after each rotation thereof to a predetermined extent a little more than one revolution and for repeatedly starting it always in the same direction, automatic means for withdrawing the tool from the blank at each stopping of the spindle, and automatically acting mechanism for effecting regular relieving movements of the tool.

161. The described combination of a rotatable blank-carrying spindle, a cutting tool, means for feeding the tool longitudinally of the blank, automatic means for repeatedly stopping the spindle after each rotation thereof to a predetermined extent and for repeatedly starting it always in the same direction, automatic means for withdrawing the tool from the blank at each stopping of the spindle, automatically acting mechanism for effecting regular relieving movements of the tool in timed relation to the spindle rotation, and means for changing the said timed relation in accordance with the feed.

162. The described combination of a rotatable blank-carrying spindle, a cutting tool, means for feeding the tool longitudinally of the blank, automatic means for repeatedly stopping the spindle after each rotation thereof to a predetermined extent and for repeatedly starting it always in the same direction, automatic means for withdrawing the tool from the blank at each stopping of the spindle, automatically acting mechanism for effecting regular relieving movements of the tool in timed relation to the spindle rotation, and means for changing the said timed relation in accordance with the feed at any one of a plurality of rates.

163. The combination of a rotatable blank-carrying spindle, a cutting tool, automatic means for effecting at intervals relative movements in the same direction between the tool and the blank longitudinally of the latter, means controlling the relative positions of the tool and blank so that they are out of contact during the feeding movements, and automatic means for stopping the blank rotation at the time of each feeding movement.

164. The combination of a rotatable blank-carrying spindle, a cutting tool, automatic means for moving the tool longitudinally at intervals and for disengaging it from the blank at the time of each longitudinal movement, and automatic means for stopping the spindle rotation during each longitudinal movement of the tool.

165. The combination of a rotatable blank-carrying spindle, a cutting tool, automatic means for moving the tool longitudinally at intervals and for disengaging it from the blank at the time of each longitudinal movement, each longitudinal movement taking place after rotation of the spindle to a predetermined extent, and automatic means for stopping the spindle rotation during each longitudinal movement of the tool.

166. The combination of a rotatable blank-carrying spindle, a cutting tool, automatic means for moving the tool longitudinally at intervals and for disengaging it from the blank at the time of each longitudinal movement, each longitudinal movement taking place after rotation of the spindle to a predetermined extent approximating one revolution but differing slightly therefrom, and automatic means for stopping the spindle rotation during each longitudinal movement of the tool.

167. The combination of a rotatable blank-carrying spindle, a rotatable milling cutter, automatic means for moving the cutter longitudinally at intervals and for disengaging it from the blank at the time of each longitudinal movement, each longitudinal movement taking place after rotation of the spindle through a little more than one complete revolution, and automatic means for stopping the spindle rotation during each longitudinal movement of the cutter.

168. The combination of a blank-carrying spindle, a cutting tool, mechanism for moving the tool longitudinally at intervals, and for disengaging the tool from the blank at the time of each longitudinal movement, mechanism for rotating the spindle to a definite predetermined extent, and means whereby each mechanism upon completion of its cycle of operations acts to stop itself and to start the other mechanism.

169. The combination of a blank-carrying spindle, a rotatable milling cutter, mechanism for moving the cutter longitudinally at intervals, means for disengaging the tool from the blank at the time of each longitudinal movement, mechanism for rotating the spindle, a shaft connected with the spindle for rotation at a slightly slower speed, and means whereby the cutter moving mechanism upon completion of its cycle of operations acts to stop itself and to start the spindle and whereby the shaft upon making a complete revolution acts to stop itself and the spindle and to start the cutter moving mechanism.

170. The combination of a rotatable blank-carrying spindle, a tool carriage movable longitudinally at intervals, a cutting tool on the carriage, means for disengaging the tool from the blank at the time of each longitudinal movement, and mechanism for effecting the aforesaid movement of the carriage and the tool at intervals, the mechanism comprising a shaft connected to the carriage and normally locked against rotation, a device for applying rotative force to the shaft and means for releasing the shaft and for then stopping it independently of the force applying device after rotation to a predetermined extent.

171. The combination of a rotatable blank-carrying spindle, a tool carriage movable longitudinally at intervals, a cutting tool on the carriage, means for disengaging the tool from the blank at the time of each longitudinal movement, mechanism for effecting the aforesaid movement of the carriage and the tool at intervals, the mechanism comprising a shaft connected to the carriage and normally locked against rotation, a device for applying rotative force to the shaft and means for releasing the shaft and for then stopping it independently of the force applying device after rotation to a predetermined extent, and change speed gearing interposed between the shaft and the carriage whereby the extent of movement of the latter may be changed.

172. The combination of a rotatable blank-carrying spindle, a tool carriage movable longitudinally at intervals, a cutting tool on the carriage, means for disengaging the tool from the blank at the time of each longitudinal movement, and mechanism for effecting the aforesaid movement of the carriage and the tool at intervals, the mechanism comprising an intermittently operated shaft, another shaft connected to the carriage and normally locked against rotation, a frictional connection between the two shafts, means operated by the first shaft for releasing the second shaft and means for then stopping the second shaft independently of the first shaft after rotation to a predetermined extent.

173. The combination of a blank-carrying spindle, mechanism for rotating the spindle to a definite predetermined extent, a carriage movable longitudinally at intervals, a rotatable milling cutter on the carriage, means for disengaging the cutter from the blank at the time of each longitudinal movement, mechanism for effecting the aforesaid movement of the carriage and the cutter at intervals, the mechanism comprising an intermittently operated shaft, another shaft connected to the carriage and normally locked against rotation, a frictional connection between the two shafts, means operated by the first shaft for releasing the second shaft and means for then stopping the second shaft independently of the first shaft after rotation to a predetermined extent, means connected with the spindle rotating mechanism for stopping the spindle after rotation to a predetermined extent and for starting the carriage moving mechanism, and means operated by the first said shaft of the carriage moving mechanism for stopping the said mechanism after its cycle of movements is complete and for starting the spindle rotating mechanism.

174. The combination of a rotatable blank-carrying spindle, a cutting tool, automatic means for moving the tool longitudinally either continuously or intermittently, automatic means for disengaging the tool from the blank at the time of longitudinal movement when the said movement is intermittent, and automatic means for stopping the spindle at the time of longitudinal movement when the said movement is intermittent.

175. A relieving machine comprising in combination, a rotatable blank-carrying spindle, a cutting tool, automatic means for effecting at intervals relative movements between the tool and the blank longitudinally of the latter, means controlling the relative positions of the tool and blank so that they are out of contact during the feeding movements, mechanism for effecting relieving movements of the tool in timed relation to the blank rotation, and automatic means for stopping the blank rotation and the relieving movements at the time of each longitudinal feeding movement.

176. A relieving machine comprising in combination, a rotatable blank-carrying spindle, a cutting tool, automatic means for effecting at intervals relative movements between the tool and the blank longitudinally of the latter, means for withdrawing the tool from the blank at the time of each longitudinal feeding movement, mechanism for effecting relieving movements of the tool in timed relation to the blank rotation, and automatic means for stopping the blank rotation and the relieving movements at the time of each longitudinal feeding movement.

177. A relieving machine comprising in combination, a rotatable blank-carrying spindle, a cutting tool, automatic means for effecting at intervals relative movements between the tool and the blank longitudinally of the latter, means for withdrawing the tool from the blank at the time of each longitudinal feeding movement, mechanism for effecting relieving movements of the tool in timed relation to the blank rotation, means for changing the said timed relation of the relieving movements in accordance with the longitudinal feed, and automatic means for stopping the blank rotation and the relieving movements at the time of each longitudinal feeding movement.

178. A relieving machine comprising in combination, a rotatable blank-carrying spindle, a cutting tool, automatic means for longitudinally moving the tool either continuously or intermittently, means for withdrawing the tool from the blank at the time of longitudinal movement when the said movement is intermittent, and automatic means for stopping the blank rotation and the relieving movements at the time of longitudinal movement when the said movement is intermittent.

179. In a machine of the class described, the combination of a rotatable blank-carrying spindle, a carriage, a cutting tool on the carriage, mechanism for moving the carriage and the tool longitudinally at intervals, and mechanism for withdrawing the tool from the blank before each longitudinal movement and for returning the tool after each longitudinal movement, the withdrawing movement being relatively rapid and the returning movement being relatively slow.

180. In a machine of the class described, the combination of a rotatable blank-carrying spindle, a cutting tool, mechanism for moving the tool radially into engagement with the blank, and means associated with the said mechanism for starting the rotation of the spindle before the blank is engaged by the tool.

181. In a machine of the class described, the combination of a rotatable blank-carrying spindle, a cutting tool, means for feeding the tool longitudinally of the blank, mechanism for moving the tool radially into engagement with the blank, and means associated with the said mechanism for starting the rotation of the spindle before the blank is engaged by the tool.

182. In a machine of the class described, the combination of a rotatable blank-carrying spindle, a cutting tool, means for feeding the tool longitudinally of the blank, mechanism for stopping and starting the spindle in timed relation to the longitudinal movement of the cutter, and mechanism for disengaging the cutter from the blank before each longitudinal movement and for returning the cutter to engagement with the blank after each longitudinal movement.

183. In a machine of the class described, the combination of a rotatable blank-carrying spindle, a cutting tool, means for feeding the tool longitudinally of the blank, mechanism for stopping and starting the spindle in timed relation to the longitudinal movement of the cutter, and mechanism for disengaging the cutter from the blank before each longitudinal movement and for returning the cutter to engagement with the blank after each longitudinal movement, the returning movement being sufficiently slow to permit the cutter to cut the blank to the maximum depth.

184. In a machine of the class described, the combination of a rotatable blank-carrying spindle, a carriage, a rotatable milling cutter on the carriage, mechanism for moving the carriage and the cutter longitudinally at intervals, mechanism for stopping and starting the spindle in timed relation to the longitudinal movement of the cutter, and mechanism for disengaging the cutter from the blank before each longitudinal movement and for returning the cutter to engagement with the blank after each longitudinal movement, the returning movement being sufficiently slow to permit the cutter to cut the blank to the maximum depth.

185. In a machine of the class described, the combination of a rotatable blank-carrying spindle, a carriage, a rotatable milling cutter on the carriage, mechanism for moving the carriage and the cutter longitudinally at intervals, mechanism for starting the spindle after each longitudinal movement of the cutter and for stopping it after rotation through a little more than one complete revolution, mechanism for disengaging the cutter from the blank before each longitudinal movement and for returning the cutter to engagement with the blank when the spindle starts to rotate, the returning movement being sufficiently slow to permit the cutter to cut the blank to the maximum depth.

186. In a machine of the class described, the combination of a rotatable blank-carrying spindle, a tool carriage, a cutting tool on the carriage, mechanism for moving the carriage and the tool longitudinally at intervals, mechanism for stopping and starting the spindle in timed relation to the longitudinal movement of the tool, means operated by the carriage moving mechanism for disengaging the tool from the blank before each longitudinal movement, and means connected with the spindle for returning the tool to engagement with the blank when the spindle starts.

187. In a machine of the class described, the combination of a rotatable blank-carrying spindle, a carriage, a rotatable milling cutter on the carriage, mechanism for moving the carriage and the cutter longitudinally at intervals, mechanism for stopping and starting the spindle in timed relation to the longitudinal movement of the cutter, means operated by the carriage moving mechanism for disengaging the cutter from the blank before each longitudinal movement, and means connected with the spindle for returning the cutter to engagement with the blank when the spindle starts, the returning movement being sufficiently slow to permit the cutter to cut the blank to the maximum depth.

188. In a machine of the class described, the combination of a rotatable blank-carrying spindle, a carriage, a rotatable milling cutter on the carriage, mechanism for moving the carriage and the cutter longitudinally at intervals, mechanism for starting the spindle after each longitudinal movement of the cutter and for stopping it after rotation through a little more than one complete revolution, means operated by the carriage moving mechanism for disengaging the cutter from the blank before each longitudinal movement, and means connected with the spindle for returning the cutter to engagement with the blank when the spindle starts, the returning movement being sufficiently slow to permit the cutter to cut the blank to the maximum depth.

189. In a machine of the class described, the combination of a blank-carrying spindle, a tool carriage, a cutting tool, mechanism for moving the carriage and the tool longitudinally at intervals, mechanism for rotating the spindle to a definite predetermined extent, means whereby each mechanism upon completion of its cycle of operations acts to stop itself and start the other mechanism, means operated by the carriage moving mechanism for disengaging the tool from the blank, and means operated by the spindle rotating mechanism for returning the tool to engagement with the blank.

190. In a machine of the class described, the combination of a work-holder, a cutting tool, means for effecting relative movement between the work and the tool to cause cutting, mechanism for effecting at intervals relative longitudinal movements between the tool and the work holder, and automatic mechanism for withdrawing the tool from the work before each longitudinal movement and for returning the tool after each longitudinal movement, the withdrawing movement being relatively rapid and the returning movement being relatively slow.

191. In a machine of the class described, the combination of a rotary work spindle, means for rotating said spindle, a rotary cutter, and means controlled by said spindle for moving said cutter to full depth into the work only while the work spindle is rotating.

192. In a machine of the class described, the combination of a rotary work spindle, a rotary cutter, means for feeding the cutter longitudinally of the work, means for rotating said spindle, and means controlled by said spindle for moving said cutter to full depth into the work only while the work spindle is rotating.

193. In a machine of the class described, the combination of a rotary work spindle, means for rotating said spindle, a rotary cutter, automatic means for stopping the rotation of the spindle, for withdrawing the cutter from engagement with the work, and for effecting a feeding movement between the cutter and the work, and automatic means for starting the rotation of the spindle and for moving the cutter to full depth into the work upon rotation of the spindle.

194. In a relieving machine, the combination of a rotatable blank-carrying spindle, a tool carriage, a cutting tool on the carriage, mechanism for effecting relieving movements of the tool, mechanism for moving the carriage and the tool longitudinally at intervals, means for disengaging the tool from the blank and removing it from the control of the relieving mechanism before longitudinal movement, and means for returning the tool to engagement with the blank and restoring it to the control of the relieving mechanism after longitudinal movement.

195. In a relieving machine, the combination of a rotatable blank-carrying spindle, a carriage, a rotatable milling cutter on the carriage, mechanism for effecting relieving movements of the cutter, mechanism for moving the carriage and the cutter longitudinally at intervals, means for disengaging the cutter from the blank and removing it from the control of the relieving mechanism before longitudinal movement, and means for returning the cutter to engagement with the blank and restoring it to the control of the relieving mechanism after longitudinal movement, the returning movement being sufficiently slow to permit the cutter to cut the blank to the maximum depth.

196. In a relieving machine, the combination of a rotatable blank-carrying spindle, a carriage, a rotatable milling cutter on the carriage, mechanism operating in timed relation to the spindle rotation for effecting relieving movements of the cutter, mechanism for moving the carriage and the cutter longitudinally at intervals, means for withdrawing the cutter from engagement with the blank and from the control of the relieving mechanism before longitudinal movement, and means for advancing the tool to engagement with the blank and to the control of the relieving mechanism after longitudinal movement, the said relieving mechanism remaining in timed relation to the spindle notwithstanding the independent movement of the cutter.

197. In a relieving machine, the combination of a rotatable blank-carrying spindle, a tool carriage, a cutting tool on the carriage, mechanism for effecting relieving movements of the tool in timed relation to the spindle rotation, mechanism for moving the carriage and the tool longitudinally at intervals, means for changing the said timed relation of the relieving movements in accordance with the longitudinal movements of the tool, means for disengaging the tool from the blank and removing it from the control of the relieving mechanism before longitudinal movement, and means for returning the tool to engagement with the blank and restoring it to the control of the relieving mechanism after longitudinal movement.

198. In a machine tool, the combination with means comprising a spindle for rotating the work, a cutting tool, and means for effecting feeding movement between the tool and the work, of a cam shaft operated by said spindle, a latch mechanism operated by said cam shaft, a rock shaft released by said latch mechanism and serving to control the work rotating means and said feeding means.

199. In a machine tool, the combination with means for rotating the work, a cutting tool, means for rotating said tool, and means for feeding the tool relative to the work, of means comprising a cam shaft operated by said work rotating means for controlling the work rotating means and the means for feeding the tool.

200. In a machine tool, the combination with means for rotating the work, a cutting tool, and means for feeding the tool relative to the work, of a cam shaft operated by the work rotating means, means operated by said cam shaft for controlling a second cam shaft and the work rotating means, and means controlled by the second cam shaft for governing the tool feeding means.

201. In a machine tool, the combination with work rotating means, a cutting tool, and means for effecting feeding movements between the tool and the work, of means operated by the work rotating means for stopping the work rotating means and for effecting operation of said feeding means.

202. In a machine tool, the combination with means comprising a spindle for rotating the work, a cutting tool, and means for effecting feeding movements between the tool and the work, of a cam shaft operated by said spindle, a latch mechanism operated by said cam shaft, a rock shaft released by said latch mechanism, means comprising a clutch mechanism operated by said rock shaft for effecting operation of said feeding means and for stopping the rotation of said spindle, and means for operating the rock shaft to rotate said spindle and stop said feeding means.

203. In a machine tool, the combination with means comprising a spindle for rotating the work, a cutting tool, and means for effecting feeding movement between the tool and the work, of a cam shaft operated by said spindle, a rock shaft, means operated by said cam shaft for controlling the rock shaft, means comprising a clutch operated by the rock shaft for stopping the rotation of the spindle and for operating said feeding means, and means controlled by said clutch means for controlling said rock shaft to stop the feeding means and operate the work rotating means.

204. In a metal cutting machine, the combination with a blank-carrying spindle, a cutting tool associated with the blank, a carriage for supporting said tool, and means for rotating said spindle, of a feed shaft for moving said carriage, two auxiliary spindles, means for respectively operating said spindles continuously and intermittently by said spindle-rotating means, and means comprising a train of gear wheels connected to said feed shaft and selectively connected to one of said auxiliary spindles according to the feed desired.

205. In a metal cutting machine, the combination with a blank-carrying spindle, a cutting tool associated with the blank, a carriage for supporting said tool, and means for rotating said spindle, of a feed shaft for moving said carriage, two auxiliary spindles, means for respectively operating said spindles at different speeds and for operating one of said spindles intermittently by said spindle-rotating means, and means comprising a train of gear wheels connected to said feed shaft and selectively connected to one of said auxiliary spindles according to the feed desired.

206. In a metal cutting machine, the combination with a blank-carrying spindle, a milling cutter associated with said blank, a carriage, a slide mounted on said carriage and rotatably supporting said milling cutter, means for rotating said spindle, means for rotating the milling cutter, a feed shaft connected to said carriage, and means for reciprocating said slide in timed relation to the blank rotation, of two auxiliary spindles respectively rotated at different speeds by said spindle-rotating means, and means comprising a train of gear wheels connected to said feed shaft and selectively connected to said auxiliary spindles according to the feed desired.

207. In a metal cutting machine, the combination with a blank-carrying spindle, a milling cutter associated with said blank, a carriage movable longitudinally along the blank, a transversely movable slide mounted on said carriage and rotatably supporting said milling cutter, a feed shaft connected to said carriage, means for rotating the spindle, means for rotating the milling cutter, and means operated by said spindle rotating means for reciprocating said slide in timed relation to the blank rotation, of two auxiliary spindles respectively rotated at different speeds by said spindle-rotating means, and a train of gear wheels connected to said feed shaft, one gear wheel of said train being mounted on one or the other of said auxiliary spindles according to the feed desired.

In testimony whereof, I hereto affix my signature.

FRIEDERICH MÜLLER.